US010893432B2

(12) United States Patent
Mitsui et al.

(10) Patent No.: US 10,893,432 B2
(45) Date of Patent: Jan. 12, 2021

(54) COMMUNICATION METHOD, CELLULAR BASE STATION AND WIRELESS LAN TERMINATION NODE

(71) Applicant: KYOCERA CORPORATION, Kyoto (JP)

(72) Inventors: Katsuhiro Mitsui, Ritto (JP); Yushi Nagasaka, Ritto (JP)

(73) Assignee: KYOCERA Corporation, Kyoto (JP)

( * ) Notice: Subject to any disclaimer, the term of this patent is extended or adjusted under 35 U.S.C. 154(b) by 182 days.

(21) Appl. No.: 15/892,792

(22) Filed: Feb. 9, 2018

(65) Prior Publication Data

US 2018/0167838 A1 Jun. 14, 2018

Related U.S. Application Data

(63) Continuation of application No. PCT/JP2016/073294, filed on Aug. 8, 2016.
(Continued)

(30) Foreign Application Priority Data

Sep. 25, 2015 (JP) .................. 2015-188086

(51) Int. Cl.
H04W 84/12 (2009.01)
H04W 28/02 (2009.01)
H04W 16/32 (2009.01)
H04W 92/04 (2009.01)
H04W 92/20 (2009.01)
(Continued)

(52) U.S. Cl.
CPC ....... *H04W 28/0205* (2013.01); *H04W 16/32* (2013.01); *H04W 24/10* (2013.01); *H04W 48/16* (2013.01); *H04W 92/04* (2013.01); *H04W 92/20* (2013.01); *H04W 84/042* (2013.01); *H04W 84/12* (2013.01)

(58) Field of Classification Search
CPC ...................................................... H04W 84/12
See application file for complete search history.

(56) References Cited

U.S. PATENT DOCUMENTS 10,009,815 B2 * 6/2018 Masini ................ H04W 24/10
2002/0188723 A1 * 12/2002 Choi .................... H04W 36/06
709/225
(Continued)

OTHER PUBLICATIONS

International Search Report issued in PCT/JP2016/073294; dated Oct. 18, 2016.
(Continued)

Primary Examiner — Ayanah S George
(74) Attorney, Agent, or Firm — Studebaker & Brackett PC

(57) ABSTRACT

A communication method, comprises: sending, by a cellular base station configured to constitute an Evolved Universal Terrestrial Radio Access Network (E-UTRAN), a plurality of pieces of wireless LAN identification information managed by the cellular base station, to a wireless LAN termination node configured to manage a wireless LAN access point; and receiving, by the wireless LAN termination node, the plurality of pieces of wireless LAN identification information from the cellular base station. The plurality of pieces of wireless LAN identification information are sent via an interface formed between the cellular base station and the wireless LAN termination node.

5 Claims, 14 Drawing Sheets

Related U.S. Application Data

(60) Provisional application No. 62/203,639, filed on Aug. 11, 2015.

(51) Int. Cl.
  *H04W 24/10* (2009.01)
  *H04W 48/16* (2009.01)
  *H04W 84/04* (2009.01)

(56) References Cited

U.S. PATENT DOCUMENTS

| | | | | |
|---|---|---|---|---|
| 2011/0222523 A1* | 9/2011 | Fu | ............. | H04W 48/08 |
| | | | | 370/338 |
| 2011/0255401 A1* | 10/2011 | Seok | ............. | H04W 48/20 |
| | | | | 370/230 |
| 2013/0003548 A1* | 1/2013 | Sridhar | ............. | H04L 47/125 |
| | | | | 370/235 |
| 2014/0112301 A1* | 4/2014 | Shu | ............. | H04W 8/245 |
| | | | | 370/329 |
| 2015/0055470 A1* | 2/2015 | Kahn | ............. | H04W 28/0268 |
| | | | | 370/235 |
| 2015/0173109 A1* | 6/2015 | Venkatesan | ............. | H04W 76/10 |
| | | | | 370/338 |

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); 3GPP TS 36.300 V12.6.0; Jun. 2015; pp. 1-254; Release 12; 3GPP Organizational Partners.

Ericsson; "Setting Up the Xw"; 3GPP TSG-RAN WG3 #87bis; R3-150740; Apr. 20-24, 2015; pp. 1-4; Tenerife—Santa Cruz, Spain.

Intel Corporation et al.; "Agreements on LTE-WLAN Radio Level Integration and Interworking Enhancement"; 3GPP TSG-RAN2 Meeting 89-bis; R2-152922; Apr. 20-24, 2015; pp. 1-6; Bratislava, Slovakia.

Catt; "Discussion on Control Plane for Xw Interface"; 3GPP TSG RAN WG3 Meeting #89; R3-151455; Aug. 24-28, 2015; pp. 1-6; Beijing, P.R.China.

Ericsson, "RAN-WLAN Architecture Model and Information Exchange", 3GPP TSG-RAN WG3 #87, R3-150325, Feb. 9th-13th, 2015, Athens, Greece.

Catt, "Discussion on Architectural and Procedure of C-plane for LTE-WLAN Aggregation", 3GPP TSG RAN WG2 Meeting #90, R2-152125, May 25th-29th, 2015, Fukuoka, Japan.

"3rd Generation Partnership Project; Technical Specification Group Radio Access Network; Study on Multiple Radio Access Technology (Multi-RAT) joint coordination", 3GPP TR 37.870 V13.0.0, Jun. 2015, pp. 1-24, Release 13, 3GPP Organizational Partners.

Huawei; Further clarification on the identified parameters for UE throughput estimation in WLAN; 3GPP TSG-RAN3 Meeting #87bis; R3-150575; Apr. 20-24, 2015; total 5 pages; Tenerife-Santa Cruz, Spain.

An Office Action issued by the Japanese Patent Office dated Mar. 20, 2018, which corresponds to Japanese Patent Application No. 2017-534410 and is related to U.S. Appl. No. 15/892,792; with English language concise explanation.

* cited by examiner

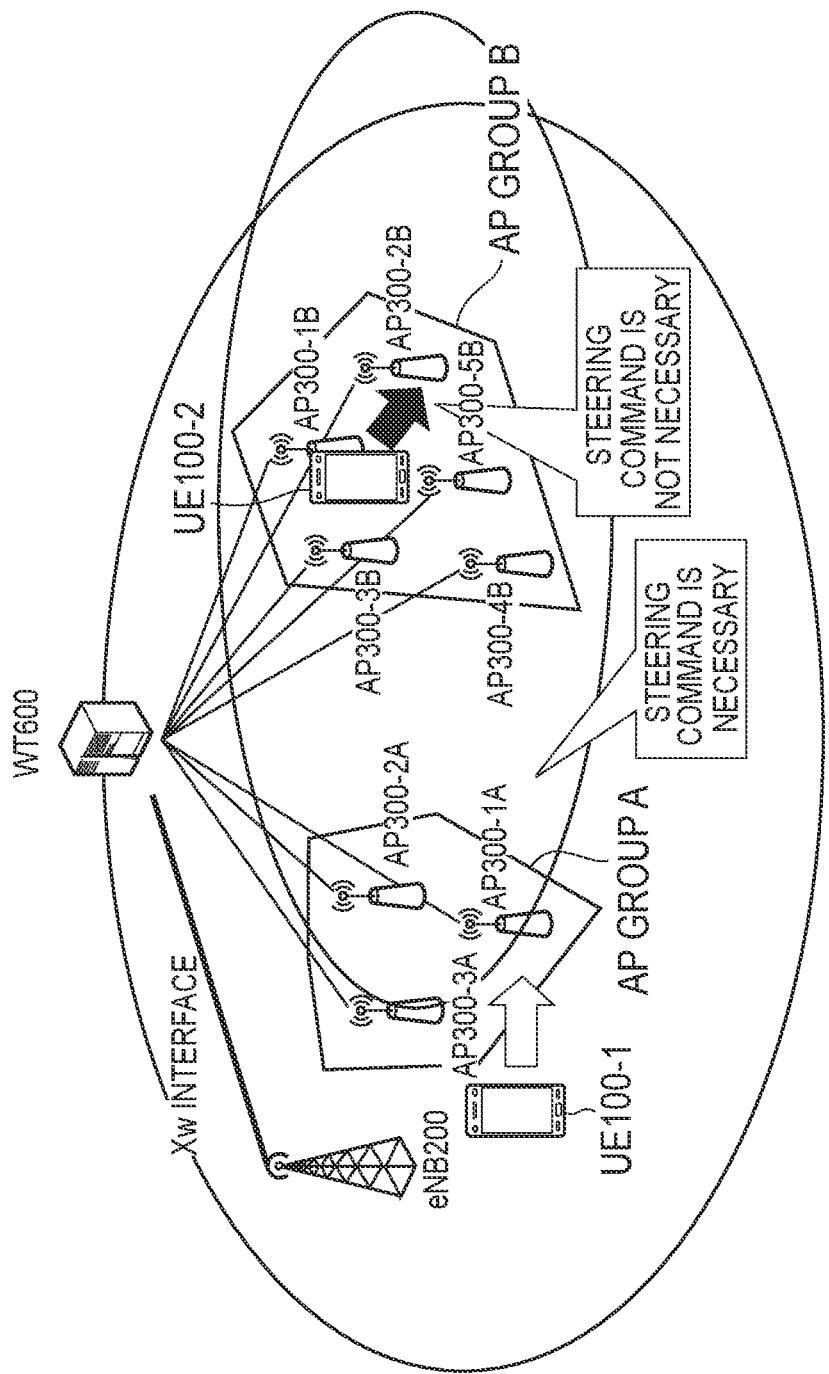

| IE/Group Name | Presence | Range | IE type and reference | Semantics description |
|---|---|---|---|---|
| Message Type | M | | 9.2.13 | |
| Global eNB ID | M | | 9.2.22 | |
| Served AP groups List | | | | Group information managed by eNB |
| >AP group information | | | | Information of each group |
| >>Group ID | | | | ID of group |
| >>>Served APs List | | | | Information of APS contained in group described above |
| >>>>AP ID | | | | ID of AP |

| IE/Group Name | Presence | Range | IE type and reference | Semantics description |
|---|---|---|---|---|
| Message Type | M | | 9.2.13 | |
| Served AP groups To Add | | | | |
| >Served AP Groups List | | | | |
| >>AP group information | | | | |
| >>>Group ID | | | | |
| >>>>Served APs List | | | | |
| >>>>>AP ID | | | | |

FIG. 13

| IE/Group Name | Presence | Range | IE type and reference | Semantics description |
|---|---|---|---|---|
| Message Type | M | | 9.2.13 | |
| eNB Measurement ID | M | | INTEGER (1..4095,...) | Allocated by eNB1 |
| WT Measurement ID | C-ifRegistration RequestStop | | INTEGER (1..4095,...) | Allocated by WT |
| Registration Request | M | | ENUMERATED(start, stop, ...) | A value set to "stop", indicates a request to stop all cells measurements. |
| Report Characteristics | O | | BITSTRING (SIZE(32)) | |
| Group To Report | | | | |
| > Group To Report Item | | | | |
| >>Group ID | | | | |
| AP To Report | | | | AP ID list for which measurement is needed |
| >AP To Report Item | | 1 .. <maxCellineNB> | | |
| >>>AP ID | M | | ECGI 9.2.14 | |
| >>>BSS Load | | | | |
| >>>UE Average data rate | | | | |
| >>>BS Average Access Delay / BSS AC Average Delay | | | | |
| >>>WAN Metrics | | | | |

FIG. 14

| IE/Group Name | Presence | Range | IE type and reference | Semantics description |
|---|---|---|---|---|
| Message Type | M | | 9.2.13 | |
| eNB Measurement ID | M | | INTEGER (1..4095,...) | Allocated by eNB |
| WT Measurement ID | M | | INTEGER (1..4095,...) | Allocated by WT |
| Group Measurement Result | | | | |
| AP Measurement Result | | | | |
| >AP Measurement Result Item | | 1 .. <maxCellineNB> | | |
| >>AP ID | M | | ECGI 9.2.14 | |
| >>> BSS Load | | | | |
| >>> UE Average data rate | | | | |
| >>> BS Average Access Delay / BSS AC Average Delay | | | | |
| >>> WAN Metrics | | | | |

FIG. 16A

| IE/Group Name | Presence | Range | IE type and reference | Semantics description |
|---|---|---|---|---|
| Message Type | M | | 9.2.13 | |
| Global eNB ID | M | | 9.2.22 | |
| Reported AP list | | | | AP that has received report from UE |
| >AP ID | | | | ID of AP |
| Served Cells | | 1 .. <maxCellineNB> | | Complete list of cells served by the eNB |
| >Served Cell Information | M | | 9.2.8 | |
| >Neighbour Information | | 0 .. <maxnoofNeighbours> | | |
| GU Group Id List | | 0 .. <maxfPools> | | List of all the pools to which the eNB belongs |
| >GU Group Id | M | | 9.2.20 | |

FIG. 16B

| IE/Group Name | Presence | Range | IE type and reference | Semantics description |
|---|---|---|---|---|
| Message Type | M | | 9.2.13 | |
| Global WT ID | M | | | |
| Reported AP Info list | | | | AP information that has received report from UE |
| >AP group ID List | | | | Each piece of group information |
| >>Group ID | | | | ID of group |
| >>>AP ID List | | | | Information of all APS belonging to group |
| >>>>AP ID | | | | ID (BSSID) of AP |
| Criticality Diagnostics | O | | 9.2.7 | |

COMMUNICATION METHOD, CELLULAR BASE STATION AND WIRELESS LAN TERMINATION NODE

RELATED APPLICATIONS

This application is a continuation application of international application PCT/JP2016/073294, filed Aug. 8, 2016, which claims benefit of U.S. Provisional Application 62/203,639, filed Aug. 11, 2015, and JP Patent Application 2015-188086, filed Sep. 25, 2015, the entirety of all applications hereby expressly incorporated by reference.

TECHNICAL FIELD

The present application relates to a base station cellular and a radio LAN termination apparatus used in a communication system.

BACKGROUND ART

LTE (Long Term Evolution) of which the specifications are designed in 3GPP (3rd Generation Partnership Project), which is a project aiming to standardize a cellular communication technology, supports a cellular/WLAN interworking technology in Release 12 and later. With such a technology, a radio terminal in an RRC connected state or an RRC idle state performs a bidirectional traffic switching (network selection and traffic steering) between an E-UTRAN and a WLAN.

In the meantime, in order to effectively use a cellular WLAN interworking technique, the introduction of an Xw interface has been considered. More specifically, the Xw interface is set between a base station and a wireless LAN termination apparatus (WT) that manages wireless LAN access points. The base station can acquire information concerning a WLAN (for example, information concerning APs in the own cell) from a wireless LAN termination apparatus (wireless LAN termination node) via the Xw interface.

SUMMARY

A communication method according to an embodiment, comprises: sending, by a cellular base station configured to constitute an Evolved Universal Terrestrial Radio Access Network (E-UTRAN), a plurality of pieces of wireless LAN identification information managed by the cellular base station, to a wireless LAN termination node configured to manage a wireless LAN access point; and receiving, by the wireless LAN termination node, the plurality of pieces of wireless LAN identification information from the cellular base station. The plurality of pieces of wireless LAN identification information are sent via an interface formed between the cellular base station and the wireless LAN termination node.

A cellular base station according to an embodiment is a cellular base station configured to constitute an Evolved Universal Terrestrial Radio Access Network (E-UTRAN), comprising a controller. The controller is configured to send a plurality of pieces of wireless LAN identification information managed by the cellular base station, to a wireless LAN termination node configured to manage a wireless LAN access point. The plurality of pieces of wireless LAN identification information are sent via an interface formed between the cellular base station and the wireless LAN termination node.

A wireless LAN access point according to an embodiment is a wireless LAN access point configured to manage a radio LAN access points, comprising a controller. The controller is configured to receive a plurality of pieces of wireless LAN identification information managed by a cellular base station, from the cellular base station. The plurality of pieces of wireless LAN identification information are sent via an interface formed between the cellular base station and the wireless LAN termination node.

BRIEF DESCRIPTION OF THE DRAWINGS

FIG. 7 is a view for explaining an operating environment according to a first embodiment.
FIG. 13 is a view for explaining the operation according to the second embodiment.
FIG. 14 is a sequence chart for explaining the operation according to the second embodiment.
FIGS. 16A and 16B are views for explaining the operation according to the third embodiment.

DESCRIPTION OF THE EMBODIMENT

[Overview of Embodiment]

Figure 1:
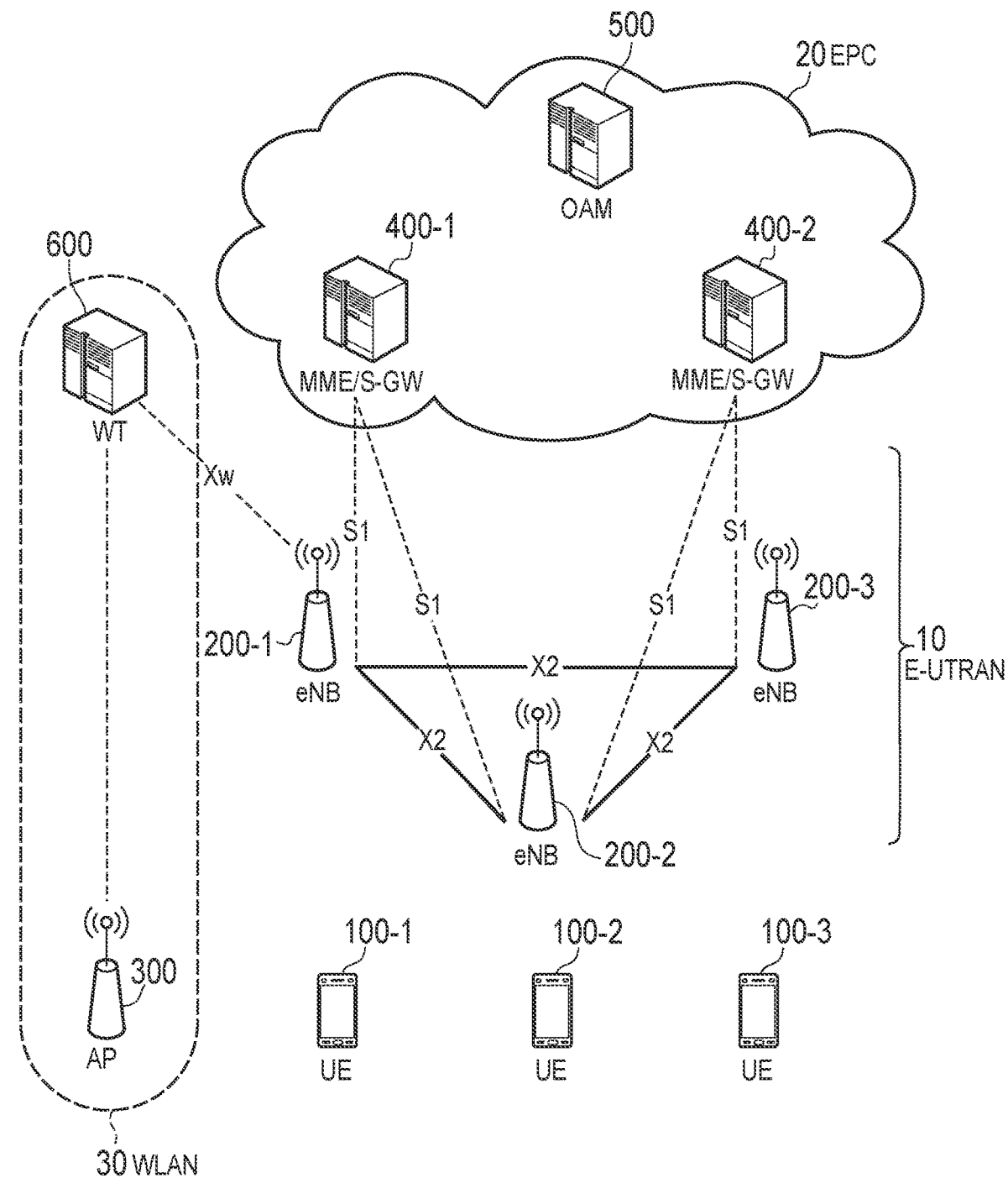
FIG. 1 is a diagram illustrating a system configuration.

Under the current specifications, there is a possibility that the information on the WLAN can not be properly shared between the base station (cellular base station) and the wireless LAN terminating device. Therefore, in the present application, it is an object of the base station and the wireless LAN terminating device to appropriately share information on the WLAN.

A cellular base station according to an embodiment comprises a controller configured to send AP group information concerning a group of wireless LAN access points set in the cellular base station to a wireless LAN termination node configured to manage the wireless LAN access points.

The controller may send the AP group information to the wireless LAN termination node when setting up an interface between the cellular base station and the wireless LAN termination node.

The controller may send the AP group information to the wireless LAN termination node upon update of the AP group information.

When sending a request for validating or invalidating a wireless LAN access point to the wireless LAN termination node, the controller may send the AP group information together with the request.

The controller may contain, in the request, information that designates a frequency band used by the wireless LAN access point to validate or invalidate the wireless LAN access point.

The controller may receive updated information from the wireless LAN termination node. The controller may send the AP group information to the wireless LAN termination node in accordance with reception of the updated information.

The controller may send the AP group information to the wireless LAN termination node, together with a request for a report concerning a resource status of the wireless LAN access point.

The controller may receive, from the wireless LAN termination node, a report concerning a resource status of the wireless LAN access point for each group of the wireless LAN access points.

The AP group information may contain identification information of the wireless LAN access point and identification information of a group to which the wireless LAN access point belongs.

A cellular base station according to an embodiment comprises a controller configured to receive, for each group of wireless LAN access points set in the cellular base station, a report concerning a resource status of the wireless LAN access point from a wireless LAN termination node configured to manage the wireless LAN access point.

The report may contain a statistical value calculated based on a resource status of each wireless LAN access point constituting the group as a value indicating a resource status of the wireless LAN access point for each group.

The report may contain a value indicating a resource status of each wireless LAN access point constituting the group as a value indicating a resource status of the wireless LAN access point for each group.

The controller may send a request for a report concerning a resource status of the wireless LAN access point for each group to the wireless LAN termination node. The controller receives the report based on the request from the wireless LAN termination node.

The controller may contain, in the request, at least one of a type of resource status contained in the report and a report period with which the report is sent to the cellular base station.

A wireless LAN termination apparatus according to an embodiment, a wireless LAN termination apparatus configured to manage wireless LAN access points, comprising a controller configured to receive AP group information concerning a group of wireless LAN access points set in a cellular base station from the cellular base station.

The controller may send, to the cellular base station, a report concerning a resource status of the wireless LAN access point for each group of the wireless LAN access points.

The controller may receive a request for a predetermined wireless LAN access point that provides a radio resource for a radio terminal in a cell managed by the cellular base station. The controller may determine whether to accept the request based on resource statuses of wireless LAN access points for each group of the wireless LAN access points including the predetermined wireless LAN access point.

A cellular base station according to an embodiment comprises a controller. The controller executes processing of sending, to a wireless LAN termination node, information concerning a wireless LAN access point reported from a radio terminal and processing of receiving AP group information concerning a group to which the wireless LAN access point belongs from the wireless LAN termination node.

The controller may execute processing of receiving, as the AP group information from the wireless LAN termination node, the information concerning the wireless LAN access point belonging to the group and information concerning a wireless LAN access point other than the wireless LAN access point.

The controller may execute processing of receiving, from the wireless LAN termination node, the AP group information transmitted in accordance with updating of the information concerning the wireless LAN access point reported from the radio terminal.

The controller may execute processing of receiving, from the wireless LAN termination node, the AP group information transmitted in accordance with updating of information concerning at least one or more wireless LAN access points belonging to the group.

A wireless LAN termination apparatus comprises a controller. The controller executes processing of receiving, from a cellular base station, information concerning a wireless LAN access point reported from a radio terminal and processing of sending AP group information concerning a group to which the wireless LAN access point belongs to the cellular base station.

The controller may execute processing of sending, as the AP group information to the cellular base station, information concerning a wireless LAN access point belonging to the group and information concerning a wireless LAN access point other than the wireless LAN access point.

The controller may execute processing of sending the AP group information to the cellular base station in accordance with updating of the information concerning the wireless LAN access point reported from the radio terminal to the cellular base station.

The controller may execute processing of sending the AP group information to the cellular base station in accordance with updating of information concerning at least one or more wireless LAN access points belonging to the group.

The controller may further execute: processing of sending the information concerning the wireless LAN access point to a management node configured to manage a group of wireless LAN access points; and processing of sending the AP group information received from the management node to the cellular base station.

A wireless LAN termination apparatus according to an embodiment is a wireless LAN termination apparatus configured to manage a plurality of wireless LAN access points. The wireless LAN termination apparatus comprises a controller. The controller executes processing of sending the plurality of pieces of wireless LAN identification information to a cellular base station constituting an E-UTRAN (Evolved Universal Terrestrial Radio Access Network). The plurality of pieces of wireless LAN identification information are sent via an Xw interface formed between the wireless LAN termination apparatus and the cellular base station.

The controller may execute processing of sending the plurality of pieces of wireless LAN identification information to the cellular base station while containing the plurality of pieces of wireless LAN identification information in a WT Configuration Update message.

The controller may execute processing of sending identification information of the wireless LAN termination apparatus to the cellular base station in addition to the plurality of pieces of wireless LAN identification information.

A cellular base station according to an embodiment is a cellular base station constituting an E-UTRAN (Evolved Universal Terrestrial Radio Access Network). The cellular base station comprises a controller. The controller executes processing of sending a plurality of pieces of wireless LAN identification information managed by the cellular base station to a wireless LAN termination node configured to manage a wireless LAN access point. The plurality of pieces of wireless LAN identification information are sent via an Xw interface formed between the cellular base station and the wireless LAN termination apparatus.

A case in which an LTE system, which is a cellular communication system configured in compliance with the 3GPP standards, can be linked with a wireless LAN (WLAN) system will be exemplified and described below with reference to drawings.

(System Configuration)

FIG. 1 is a diagram illustrating a system configuration according to an embodiment. As illustrated in FIG. 1, the LTE system includes a plurality of UEs (User Equipment) 100, an E-UTRAN (Evolved Universal Terrestrial Radio Access Network) 10, and an EPC (Evolved Packet Core) 20.

The E-UTRAN 10 corresponds to a cellular RAN. The EPC 20 corresponds to a core network. The E-UTRAN 10 and the EPC 20 configure a network of the LTE system.

The UE 100 is a mobile radio communication device. The UE 100 corresponds to a radio terminal (an User Equipment). The UE 100 is a terminal that supports both communication schemes of cellular communication and WLAN communication (dual terminal).

The E-UTRAN 10 includes a plurality of eNBs 200 (evolved Node-Bs). The eNB 200 corresponds to a base station. The eNB 200 manages one or a plurality of cells, and performs radio communication with the UE 100 that exists in the cell of the eNB 200. The "cell" is used as a term indicating a smallest unit of a radio communication area, and is also used as a term indicating a function (resource) of performing radio communication with the UE 100. The eNB 200 has a radio resource management (RRM) function, a routing function of user data, a measurement control function for mobility control and scheduling, and the like.

The eNBs 200 are connected mutually via an X2 interface. The eNB 200 is connected, via an S1 interface, to an MME (Mobility Management Entity)/S-GW (Serving-Gateway) 400 included in the EPC 20. In addition, the eNB 200 is connected, via an Xw interface, to a WT 600 described below.

The EPC 200 includes a plurality of MME/S-GWs 400 and an OAM 500. The MME is a network node for performing, for example, various types of mobility controls for the UE 100, and corresponds to a controller. The S-GW is a network node that performs control to transfer user data and corresponds to a mobile switching center. The OAM is a server apparatus managed by an operator and maintains and monitors the E-UTRAN 10.

The WLAN 30 may include a WLAN access point (hereinafter, called an "AP") 300, and a WLAN termination apparatus (hereinafter, called a "WT") 600. The WT 600 is a node in the WLAN, and is connected to the eNB 200 via the Xw interface. The WT 600 manages one or more APs 300. The WT 600 can transmit, to the eNB 200, information about the AP 300 managed by the WT 600. Further, the WT 600 can transmit, to the AP 300 managed by the WT 600, information received from the eNB 200.

Note that the Xw interface is a logical interface between a 3GPP RAN and the WLAN. The Xw interface terminates at the eNB 200 at the LTE (3GPP RAN) side, and terminates at the WT 600 at the WLAN side. In FIG. 1, the Xw interface is an interface directly connecting the eNB 200 and the WT 600, but may also be an interface passing through the MME/S-GW 400 and a P-GW 500.

The WLAN 30 is configured to comply with standards of IEEE 802.11, for example. The AP 300 performs WLAN communication with the UE 100 in a frequency band different from a cellular frequency band. Generally, the WLAN communication is performed through an unlicensed band. The cellular communication is performed through a licensed band. The AP 300 is connected to the EPC 20 via a router, and the like.

It is noted that, the EPC 20 may further include an ANDSF (Access Network Discovery and Selection Function) server. The ANDSF server manages ANDSF information on the WLAN 30. The ANDSF server provides the ANDSF information on the WLAN 30.

Figure 2:
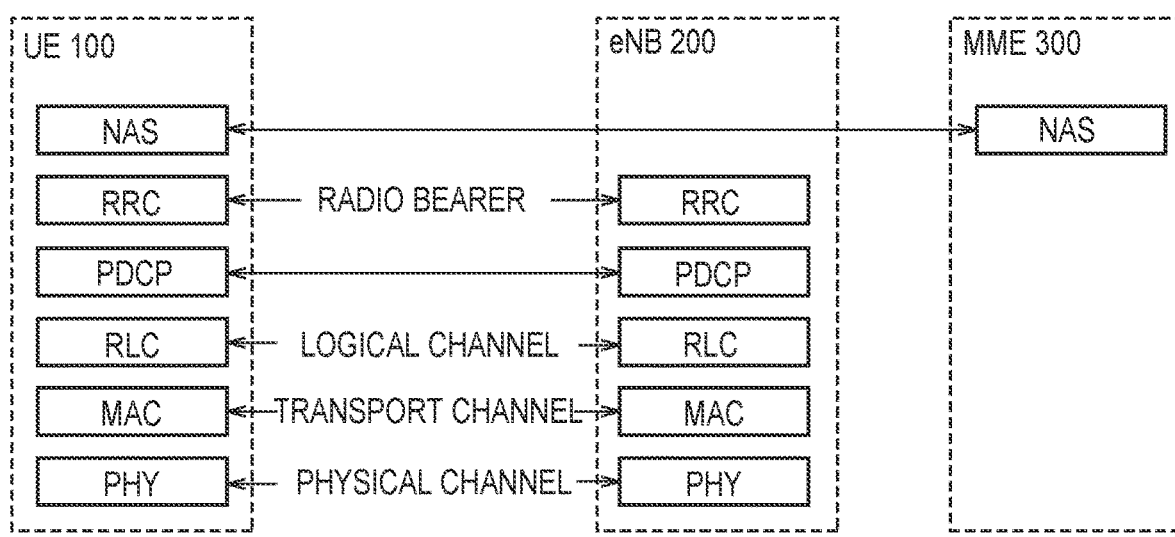
FIG. 2 is a protocol stuck diagram of radio interface in a LTE system.

FIG. 2 is a protocol stack diagram of a radio interface in the LTE system. As illustrated in FIG. 2, the radio interface protocol is classified into a first layer to a third layer of an OSI reference model. The first layer is a physical (PHY) layer. The second layer includes a MAC (Medium Access Control) layer, an RLC (Radio Link Control) layer, and a PDCP (Packet Data Convergence Protocol) layer. The third layer includes an RRC (Radio Resource Control) layer.

The physical layer performs coding and decoding, modulation and demodulation, antenna mapping and demapping, and resource mapping and demapping. Between the physical layer of the UE 100 and the physical layer of the eNB 200, data and control signals are transmitted via a physical channel.

The MAC layer performs priority control of data, a re-transmission process by a hybrid ARQ (HARQ), a random access procedure, and the like. Between the MAC layer of the UE 100 and the MAC layer of the eNB 200, data and control signals are transmitted via a transport channel. The MAC layer of the eNB 200 includes a scheduler configured to determine a transport format (a transport block size and a modulation and coding scheme (MCS)) of an uplink and a downlink, and a resource block to be allocated to the UE 100.

The RLC layer uses functions of the MAC layer and the physical layer to transmit data to the RLC layer of a reception side. Between the RLC layer of the UE 100 and the RLC layer of the eNB 200, data and control signals are transmitted via a logical channel.

The PDCP layer performs header compression and decompression, and encryption and decryption.

The RRC layer is defined only in a control plane that handles control signals. Between the RRC layer of the UE 100 and the RRC layer of the eNB 200, a message (RRC message) for various types of settings is transmitted. The RRC layer controls a logical channel, a transport channel, and a physical channel depending on the establishment, re-establishment, and release of a radio bearer. If a connection (RRC connection) is established between the RRC of the UE 100 and the RRC of the eNB 200, the UE 100 is in an RRC connected state (connected state), and if the connection is not established, the UE 100 is in an RRC idle state (idle state).

An NAS (Non-Access Stratum) layer positioned above the RRC layer performs session management, mobility management and the like.

(Basic Operation of Terminal-Based Switching Control)

In 3GPP Release 12 and later, a cellular/WLAN radio interworking technology is supported. With such a technology, the UE 100 in the RRC connected state or the RRC idle state performs a bidirectional traffic switching (network selection and traffic steering) between the E-UTRAN 10 and the WLAN 30.

The traffic switching is performed at the initiative of the UE 100 (UE based) with an aid of the E-UTRAN 10. Further, the traffic switching is performed in an APN (Access Point Name) unit. Hereinafter, such switching control is referred to as "UE-based switching control".

The E-UTRAN 10 transmits, to the UE 100, assistance information (RAN assistance parameters) by a broadcast RRC signaling or a dedicated RRC signaling. The broadcast RRC signaling, for example, is an SIB (System Information Block). The dedicated RRC signaling, for example, is an RRC Connection Reconfiguration message.

The assistance information includes: a strength (received power) threshold value and a quality threshold value of an E-UTRAN signal; a threshold value of a WLAN channel usage rate; a threshold value of a WLAN backhaul data rate; a strength (received power) threshold value and a quality threshold value of a WLAN signal; and the like. The assistance information may include a WLAN identifier that is a target of the UE-based switching control. The WLAN identifier is an SSID, BSSID, HESSID, and the like. The assistance information may include a parameter that designates a period during which a threshold value (determination condition) should be satisfied.

The UE 100 configured to support the UE-based switching control receives the assistance information and stores the received assistance information. Upon performing a cell reselection or a handover, the UE 100 may discard the stored assistance information.

Next, the UE 100 performs the UE-based switching control.

First of all, an example of a switching from the cellular communication to the WLAN communication, that is, a switching from the E-UTRAN 10 to the WLAN 30 will be described. The UE 100 performs, based on a first determination condition regarding the cellular and a second determination condition regarding the WLAN, a switching determination regarding whether or not to switch from the cellular communication to the WLAN communication. Specifically, if both the first determination condition and the second determination condition are satisfied, the UE 100 performs the switching from the cellular communication to the WLAN communication.

$$\text{RSRPmeas} < \text{Thresh}_{ServingOffloadWLAN, LowP}; \text{ or}$$

$$\text{RSRQmeas} < \text{Thresh}_{ServingOffloadWLAN, LowQ};$$

Here, "RSRPmeas" is a received power of a cellular reception signal, i.e., a reference signal received power (RSRP) measured at the UE 100. "RSRQmeas" is a reception quality of a cellular reception signal, i.e., a reference signal reception quality (RSRQ) measured at the UE 100. "ThreshServingOffloadWLAN, LowP" and "ThreshServing OffloadWLAN, LowQ" are included in the assistance information, and are threshold values for switching to the WLAN 30.

The second determination condition is the following conditions for a target WLAN:

$$\text{ChannelUtilizationWLAN} < \text{Thresh}_{ChUtilWLAN, Low};$$
and $$\text{BackhaulRateDlWLAN} > \text{Thresh}_{BackhRateDLWLAN, High};$$
and $$\text{BackhaulRateUlWLAN} > \text{Thresh}_{BackhRateULWLAN, High};$$
and $$\text{BeaconRSSI} > \text{Thresh}_{BeaconRSSIWLAN, High};$$

Here, "ChannelUtilizationWLAN" is included in a WLAN beacon or a probe response, and indicates a WLAN channel usage rate, i.e., a WLAN radio load level. "BackhaulRateDlWLAN" and "BackhaulRateUlWLAN" are provided from an ANQP (Access Network Query Protocol), and indicate an available transmission rate of WLAN backhaul, i.e., a WLAN backhaul load level. "BeaconRSSI" indicates reception signal intensity of a beacon signal measured at the UE 100. "Thresh$_{ChUtilWLAN, Low}$", "Thresh$_{BackhRateDLWLAN, High}$", "Thresh$_{BackhRateULWLAN, High}$", and "Thresh$_{BeaconRSSIWLAN, High}$" are included in the assistance information, and are threshold values for switching to the WLAN 30.

It is noted that when performing the switching from the cellular communication to the WLAN communication, the UE 100 notifies an upper layer (higher layer/upper layer) configured to perform bidirectional traffic switching control between the E-UTRAN 10 and the WLAN 30 of, together with (a list (list of WLAN identifiers) of) identifiers of the AP 300 (WLAN identifier) that satisfies the second determination condition, information indicating the traffic switching to the WLAN communication (move-traffic-to-WLAN indication). Specifically, an AS layer in the UE 100 notifies an NAS layer in the UE 100 of the WLAN identifier (and the information), and the NAS layer in the UE 100 uses an NAS procedure to notify the upper station (MME). The UE 100 executes control, based on an instruction from the upper station that receives the notification of the WLAN identifier, of switching from the cellular communication to the WLAN communication (switching from a communication route through the eNB 200 to a communication route through the AP 300).

Next, an example of a switching from the WLAN communication to the cellular communication, that is, a switching from the WLAN 30 to the E-UTRAN 10 will be described. The UE 100 performs, based on a third determination condition regarding the cellular and a fourth determination condition regarding the WLAN, a switching determination regarding whether or not to switch from the WLAN communication to the cellular communication. Specifically, if one of the third determination condition and the fourth determination condition is satisfied, the UE 100 performs the switching from the WLAN communication to the cellular communication.

The third determination condition is the following conditions for an E-UTRAN target cell:

$$\text{RSRPmeas} > \text{Thresh}_{ServingOffloadWLAN, HighP}; \text{ and}$$

$$\text{RSRQmeas} > \text{Thresh}_{ServingOffloadWLAN, HighQ};$$

Here, "Thresh$_{ServingOffloadWLAN, HighP}$" and "Thresh$_{ServingOffloadWLAN, HighQ}$" are included in the assistance information, and are threshold values for switching to the E-UTRAN 10.

The fourth determination condition is the following conditions for a source WLAN:

$$\text{ChannelUtilizationWLAN} > \text{Thresh}_{ChUtilWLAN, High}; \text{ or}$$

BackhaulRateDlWLAN<Thresh$_{BackhRateDLWLAN, Low}$;
or

BackhaulRateUlWLAN<Thresh$_{BackhRateULWLAN, Low}$;
or

BeaconRSSI<Thresh$_{BeaconRSSIWLAN, Low}$;

Here, "Thresh$_{ChUtilWLAN, High}$," "Thresh$_{BackhRateDLWLAN, Low}$," "Thresh$_{BackhRateULWLAN, Low}$," and "Thresh$_{BeaconRSSIWLAN, Low}$" are included in the assistance information, and are threshold values for switching to the E-UTRAN 10.

(Radio Terminal)

Figure 3:
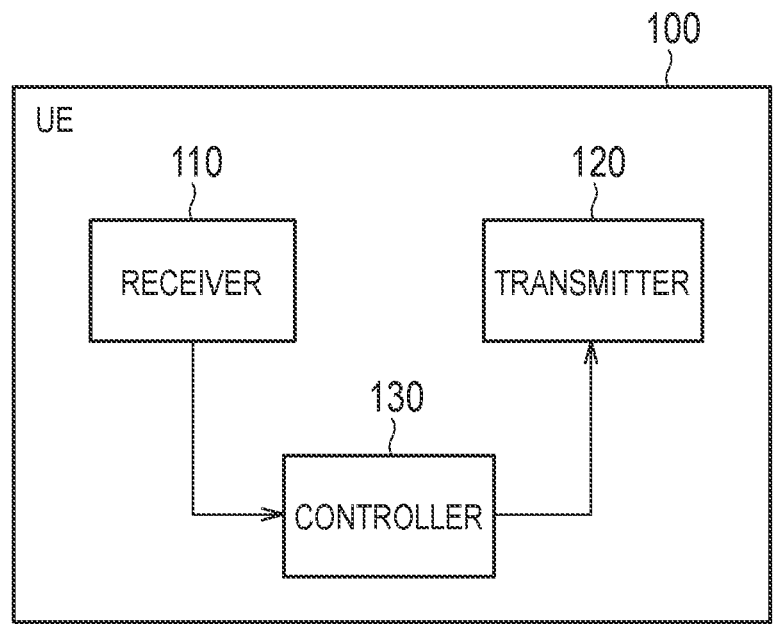
FIG. 3 is a block diagram illustrating a UE 100.

A configuration of the UE 100 (radio terminal) will be described, below. FIG. 3 is a block diagram illustrating the UE 100.

As illustrated in FIG. 3, the UE 100 includes a receiver 110, a transmitter 120, and a controller 130. The receiver 110 and the transmitter 120 may be unified as one in the form of a transceiver. Further, the UE 100 may include a receiver 110 and a transmitter 120 used in common in cellular communication and WLAN communication. The UE 100 may include a receiver 110 and a transmitter 120 for cellular communication, and a receiver 110 and a transmitter 120 for WLAN communication, respectively.

The receiver 110 performs various types of receptions under the control of the controller 130. The receiver 110 includes an antenna. The receiver 110 converts a radio signal received by the antenna into a baseband signal (received signal), and outputs the baseband signal to the controller 130.

The transmitter 120 performs various types of transmissions under the control of the controller 130. The transmitter 120 includes an antenna. The transmitter 120 converts a baseband signal (transmission signal) output from the controller 130 into a radio signal, and transmits the radio signal from the antenna.

The controller 130 performs various types of controls in the UE 100. The controller 130 can control the receiver 101 and the transceiver 102. The controller 130 includes a processor and a memory. The memory stores a program to be executed by the processor, and information to be used for a process by the processor. The processor includes a baseband processor configured to perform modulation and demodulation, encoding and decoding and the like of a baseband signal, and a CPU (Central Processing Unit) configured to perform various processes by executing the program stored in the memory. The controller 130 executes various types of processes described later, and various types of communication protocols described above.

(Base Station)

Figure 4:
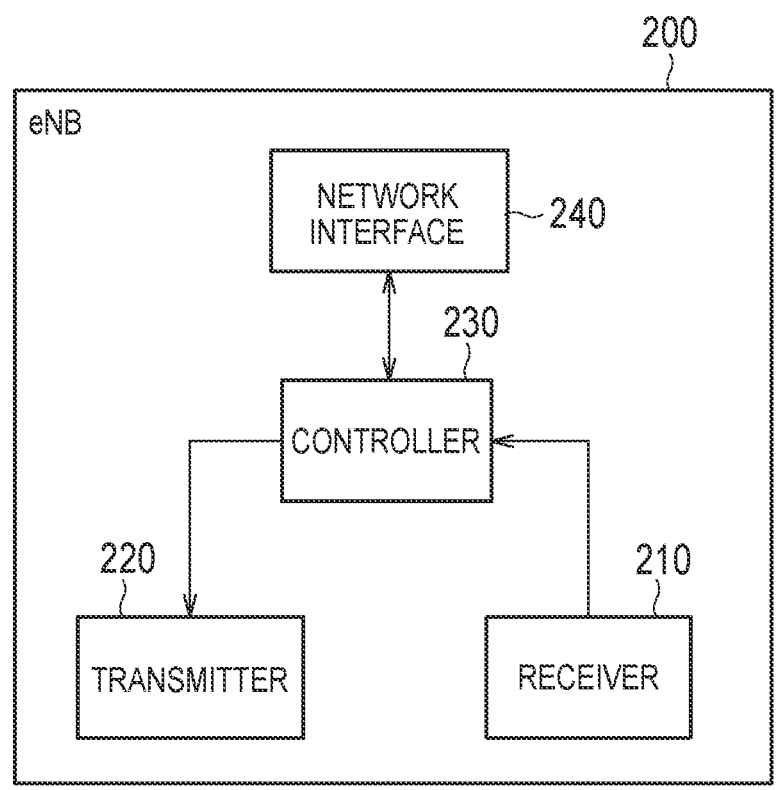
FIG. 4 is a block diagram illustrating an eNB 200.

A configuration of the eNB 200 (base station) will be described, below. FIG. 4 is a block diagram illustrating the eNB 200.

As illustrated in FIG. 4, the eNB 200 includes a receiver 210, a transmitter 220, a controller 230, and a network interface 240. The receiver 210 and the transmitter 220 may be unified as one in the form of a transceiver.

The receiver 210 performs various types of receptions under the control of the controller 230. The receiver 210 includes an antenna. The receiver 210 converts a radio signal received by the antenna into a baseband signal (received signal), and outputs the baseband signal to the controller 230.

The transmitter 220 performs various types of transmissions under the control of the controller 230. The transmitter 220 includes an antenna. The transmitter 220 converts a baseband signal (transmission signal) output from the controller 230 into a radio signal, and transmits the radio signal from the antenna.

The controller 230 performs various types of controls in the eNB 200. The controller 230 can control the receiver 210, the transmitter 220, and the network interface 240. The controller 230 includes a processor and a memory. The memory stores a program to be executed by the processor, and information to be used for a process by the processor. The processor includes a baseband processor configured to perform modulation and demodulation, encoding and decoding and the like of a baseband signal, and a CPU (Central Processing Unit) configured to perform various processes by executing the program stored in the memory. The controller 230 executes various types of processes described later, and various types of communication protocols described above.

The network interface 240 is connected to a neighbour eNB 200 via the X2 interface, and is connected to the MME/S-GW 300 via the S1 interface. The network interface 240 is used for communication performed over the X2 interface, communication performed over the S1 interface, and the like.

Further, the network interface 240 is connected to the WT 600 via the Xw interface. The network interface 240 is used for communication performed over the Xw interface, and the like.

(Wireless LAN Access Point)

Figure 5:
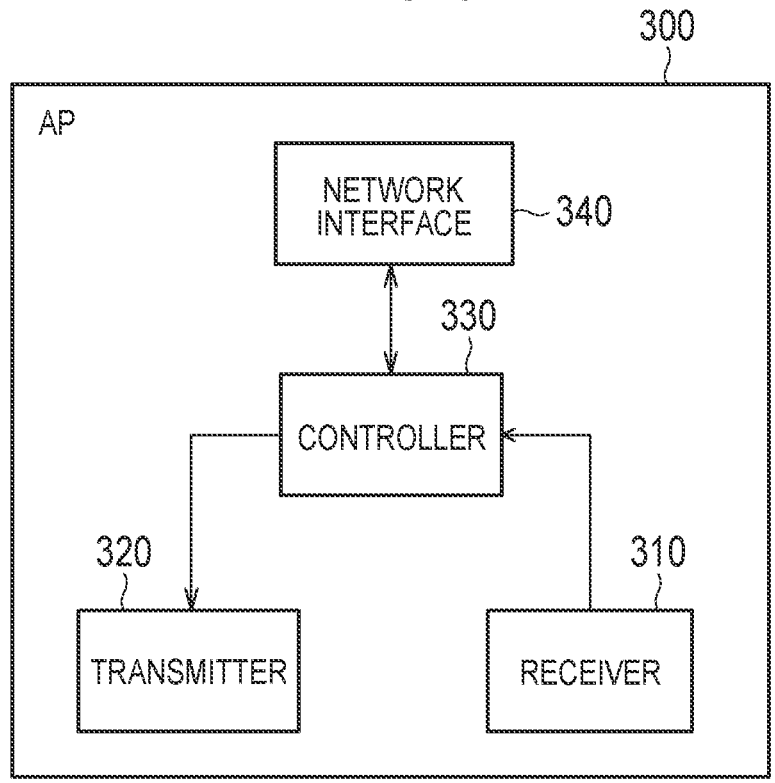
FIG. 5 is a block diagram illustrating an AP 300.

A configuration of the AP 300 (wireless LAN access point) will be described, below. FIG. 5 is a block diagram illustrating the AP 300.

As illustrated in FIG. 5, the AP 300 includes a receiver 310, a transmitter 320, a controller 330, and a network interface 340. The receiver 310 and the transmitter 320 may be unified as one in the form of a transceiver.

The receiver 310 performs various types of receptions under the control of the controller 330. The receiver 310 includes an antenna. The receiver 310 converts a radio signal received by the antenna into a baseband signal (received signal), and outputs the baseband signal to the controller 330.

The transmitter 320 performs various types of transmissions under the control of the controller 330. The transmitter 320 includes an antenna. The transmitter 320 converts a baseband signal (transmission signal) output from the controller 330 into a radio signal, and transmits the radio signal from the antenna.

The controller 330 performs various types of controls in the AP 300. The controller 330 can control the receiver 310, the transmitter 320, and the network interface 340. The controller 330 includes a processor and a memory. The memory stores a program to be executed by the processor, and information to be used for a process by the processor. The processor includes a baseband processor configured to perform modulation and demodulation, encoding and decoding and the like of a baseband signal, and a CPU (Central Processing Unit) configured to perform various processes by executing the program stored in the memory. The controller 330 executes various types of processes described later, and various types of communication protocols described above.

The network interface 340 is connected to a backhaul via a predetermined interface. Further, the network interface 340 is connected to the WT 600. The network interface 330 is used for communication with the WT 600, and the like.

(Wireless LAN Termination Apparatus)

Figure 6:
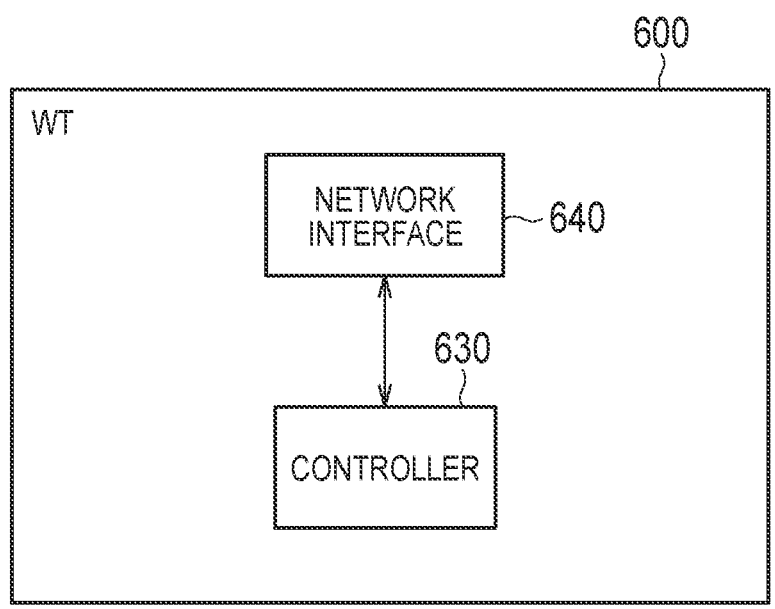
FIG. 6 is a block diagram illustrating an WT 600.

A configuration of the WT 600 (wireless LAN termination apparatus) will be described, below. FIG. 6 is a block diagram illustrating the WT 600.

As illustrated in FIG. 6, the WT 600 includes a controller 630 and a network interface 640.

The controller 630 performs various types of controls in the WT 600. The controller 630 can control the network interface 640. The controller 630 includes a processor and a memory. The memory stores a program to be executed by the processor, and information to be used for a process by the processor. The processor includes a baseband processor configured to perform modulation and demodulation, encoding and decoding and the like of a baseband signal, and a CPU (Central Processing Unit) configured to perform various processes by executing the program stored in the memory. The controller 630 executes various types of processes described later, and various types of communication protocols described above.

The network interface 640 is connected to a backhaul via a predetermined interface. Further, the network interface 640 is connected to the AP 300. The network interface 640 is used for communication with the AP 300, and the like.

Further, the network interface 640 is connected to the eNB 200 via the Xw interface. The network interface 640 is used for communication performed over the Xw interface, and the like.

First Embodiment

Figures 8A, 8B:
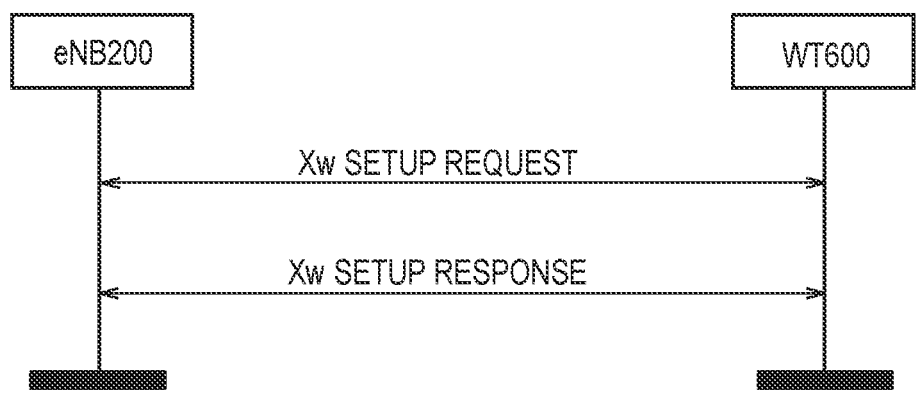
FIGS. 8A and 8B are sequence charts for explaining an operation (part 1) according to the first embodiment.
Figures 9A, 9B:
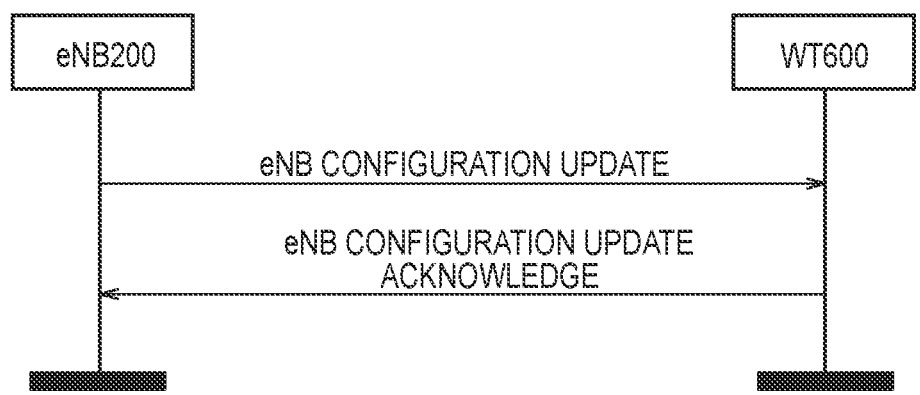
FIGS. 9A and 9B are sequence charts for explaining an operation (part 2) according to the first embodiment.
Figure 10:
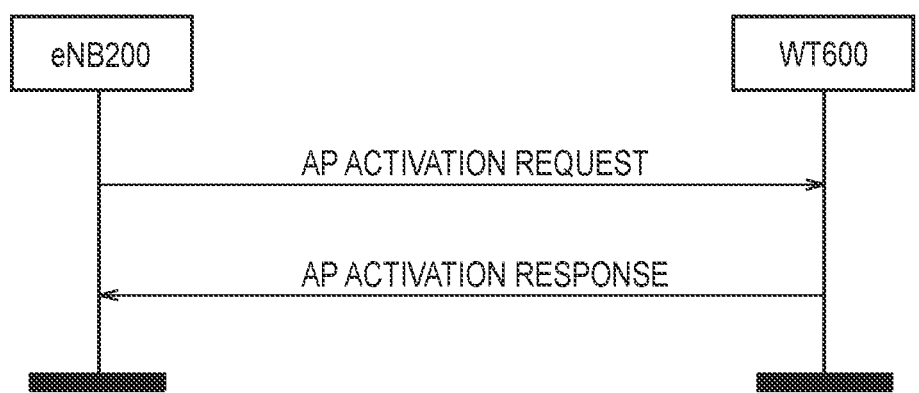
FIG. 10 is a sequence chart for explaining an operation (part 3) according to the first embodiment.
Figure 11:
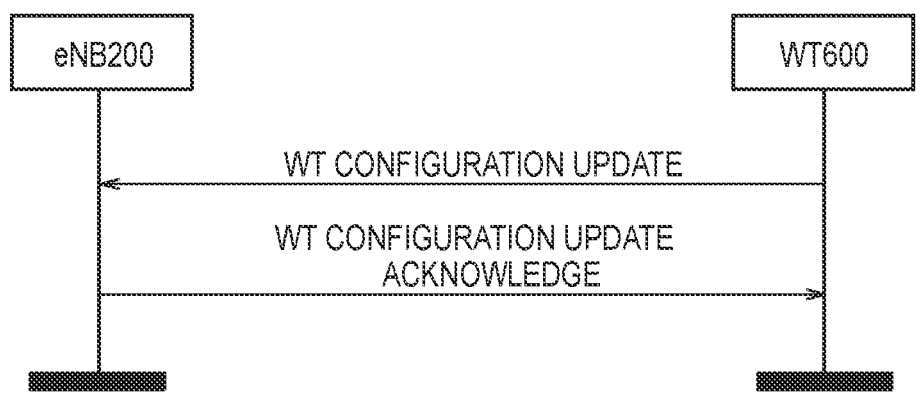
FIG. 11 is a sequence chart for explaining an operation (part 4) according to the first embodiment.
Figure 12:
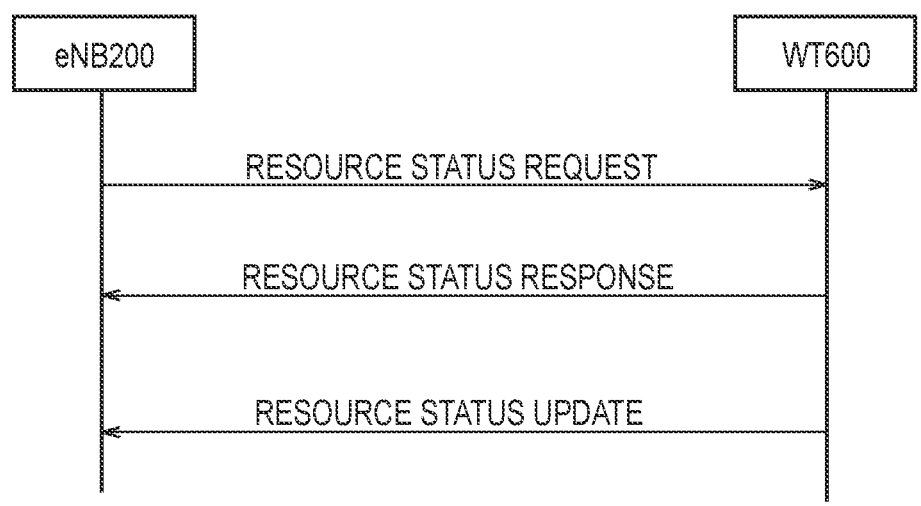
FIG. 12 is a sequence chart for explaining an operation (part 5) according to the first embodiment and an operation according to a second embodiment.

The first embodiment will be described below with reference to FIGS. 7 to 12. FIG. 7 is a view for explaining an operating environment according to the first embodiment. FIG. 8A is a sequence chart for explaining an operation (part 1) according to the first embodiment. FIG. 8B is a view for explaining the operation (part 1) according to the first embodiment. FIG. 9A is a view for explaining the operation (part 2) according to the first embodiment. FIG. 9B is a view for explaining the operation (part 2) according to the first embodiment. FIG. 10 is a sequence chart for explaining the operation (part 3) according to the first embodiment. FIG. 11 is a sequence chart for explaining the operation (part 4) according to the first embodiment. FIG. 12 is a sequence chart for explaining the operation (part 5) according to the first embodiment.

As illustrated in FIG. 7, an eNB 200 manages a cell. A plurality of APs 300 are located in the cell managed by the eNB 200.

The eNB 200 grasps the plurality of APs 300 located in the own cell. For example, the eNB 200 may grasp the plurality of APs 300 located in the own cell based on reports concerning the APs 300 from a UE 100. The eNB 200 may grasp the plurality of APs 300 located in the own cell by receiving information concerning the APs 300 managed by a WT 600 from the WT 600.

The eNB 200 manages the plurality of APs 300 located in the own cell for each group. First of all, the eNB 200 divides the plurality of APs 300 into groups. That is, the eNB 200 sets AP groups to which the respective APs 300 belong. In this embodiment, as illustrated in FIG. 7, the eNB 200 sets an AP 300-1A to an AP 300-3A for AP group A, and sets an AP 300-1B to an AP 300-5B for AP group B. Accordingly, the AP 300-1A to the AP 300-3A belong to AP group A. The AP 300-1B to the AP 300-5B belong to AP group B.

The eNB 200 may set AP groups based on the capabilities of APs. The eNB 200 sets AP groups to which the APs 300 belong based on, for example, the frequency bands used by the APs 300. The eNB 200 may set a plurality of APs 300 using the same frequency band as APs belonging to the same AP group. The eNB 200 may also set a plurality of APs 300 using different frequency bands so as to allow the UE 100 to use a plurality of frequency bands.

The eNB 200 may set AP groups based on reports concerning the APs 300 from the UE 100. For example, upon detecting a radio signal (beacon signal) from the AP 300, the UE 100 can transmit a report containing identification information of the detected AP 300 to the eNB 200. The eNB 200 may specify a plurality of APs 300 located near each other based on reports from the UE 100, and may set the plurality of APs 300 as APs belonging to the same group. If a report from the UE 100 contains information indicating the time when the AP 300 is detected and information indicating the reception intensity of a radio signal from the AP 300, the eNB 200 may set an AP group to which the AP 300 belongs based on the information indicating the time and the information indicating the reception intensity.

An OAM 500 may divide the plurality of APs 300 into groups. The OAM 500 can perform grouping like the eNB 200. The OAM 500 can receive information (for example, reports from the UE 100) necessary for grouping from the eNB 200 and/or the WT 600 and perform grouping. The OAM 500 sends, to the eNB 200, configuration information containing information concerning AP groups and the APs 300 belonging to the AP groups. The eNB 200 sets AP groups based on the configuration information.

The eNB 200 sends AP group information concerning the AP groups set by the eNB 200 to the WT 600. The WT 600 can know the AP groups set by the eNB 200 based on the AP group information. This enables the WT 600, like the eNB 200, to manage the APs 300, managed by the WT 600, for each group.

In this case, when the eNB 200 (or an EPC 20) manages the respective APs 300 for each group constituted by (a plurality of) APs 300, the WT 600 may not know the AP groups to which the respective APs 300 set by the eNB 200 belong. Accordingly, the eNB 200 can send AP group information to the WT 600 by using at least one of the following methods.

(A) Xw Setup Procedure

As illustrated in FIG. 8A, when an Xw interface is set up between the eNB 200 and the WT 600, the eNB 200 can send AP group information to the WT 600. That is, the eNB 200 can send AP group information to the WT 600 in an Xw setup procedure. The Xw setup procedure is a procedure for exchanging configuration data needed for the eNB 200 and the WT 600 to interoperate correctly over the Xw interface.

For example, the eNB 200 sends an Xw setup request (Xw SETUP REQUEST) message containing AP group information to the WT 600. The Xw setup request message is a message for starting an Xw setup procedure. In addition, the Xw setup request message is a message for transferring information needed for setting an Xw interface.

As shown in FIG. 8B, AP group information contains identification information (AP ID) of the APs 300 and identification information (Group ID) of the group to which the APs 300 belong. An AP ID corresponds to a WLAN identifier (SSID, BSSID, ESSID, HESSID, or the like).

Group ID may be associated with list information (Served APs List) of APs included in the group indicated by Group ID. AP group information may contain list information (Served AP groups List) of AP groups managed by the eNB 200. The list information of AP groups may contain list information (Served APs List) of APs belonging to the respective groups. For example, AP group information contains the list information of APs belonging to "AP group A" and "AP group B". The list information of APs belonging to AP group A contains the identifiers of the AP 300-1A, an AP 300-2A, and the AP 300-3A.

Upon receiving an Xw setup request message from the WT 600, the eNB 200 may send an Xw setup response (Xw SETUP RESPONSE) containing AP group information to the WT 600. The Xw setup response message is a response message corresponding to the Xw setup request message. The Xw setup response message is also a message for transferring information necessary to set an Xw interface.

(B) eNB Configuration Update Procedure

As illustrated in FIG. 9A, when AP group information is updated, the eNB 200 sends AP group information to the WT 600. That is, the eNB 200 can send AP group information to the WT 600 in accordance with an eNB configuration update procedure. The eNB configuration update procedure is a procedure for updating configuration data necessary for the eNB 200 and the WT 600 to accurately mutually use the data on the Xw interface.

For example, the eNB 200 sends an eNB configuration update (ENB CONFIGURATION UPDATE) message containing AP group information to the WT 600. The eNB configuration update message is a message for transferring updated information. The eNB configuration update message may be an existing eNB configuration update message extended to contain AP group information or a message newly specified to transfer updated information to the WT 600.

As shown in FIG. 9B, the eNB configuration update message may contain information (Served AP groups To Add) concerning an AP group added as an AP group managed by the eNB 200. The added AP group information can contain information similar to "(A) Xw Setup Procedure" described above (see FIG. 8B).

The eNB 200 may also send eNB configuration update message containing updated AP group information (Served AP groups To Modify) to the WT 600. For example, when a new AP 300 is added to an existing AP group or an AP 300 belonging to an existing AP group is added to another AP group, the eNB 200 may contain, in an eNB configuration update message, the updated AP group information containing the identification information of the AP 300 and the identification information of the group to which the AP 300 belongs. In addition, when the AP 300 is deleted from the AP group, the eNB 200 may contain the identification information of the deleted AP 300 in an eNB configuration update message. The eNB 200 may or may not contain the identification information of the AP group to which the AP 300 belongs in the eNB configuration update message.

The eNB 200 may send eNB configuration update message containing the information (Served AP groups To Delete) of a deleted AP group to the WT 600. For example, when an AP group is deleted, the eNB 200 can contain the information of the deleted AP group containing the identification information of the deleted AP group in an eNB configuration update message.

Even when AP group information is not updated, the eNB 200 may send an eNB configuration update message containing the information of an AP group to the WT 600. For example, when AP group information has not been sent to the WT 600, the eNB 200 may send the AP group information with an eNB configuration update message.

(C) AP Activation Procedure/AP Deactivation Procedure

As illustrated in FIG. 10, when sending a request for validation (activation) of the AP 300 to the WT 600, the eNB 200 can send AP group information together with the request. That is, in the AP activation procedure, the eNB 200 can send the AP group information to the WT 600. The AP activation procedure is a procedure for requesting the WT 600 to switch the invalid AP 300 to a valid (ON) state.

For example, the eNB 200 sends an AP activation request (AP ACTIVATION REQUEST) message containing AP group information to the WT 600. An AP activation request message is a message for validating the invalid AP 300. An AP activation request message may be a message for turning on the AP 300 whose switch is turned off (or a communication device (transmitter and/or receiver) which the AP 300 includes and whose switch is turned off).

An AP activation request message contains validation AP information concerning the AP 300 to be validated. Validation AP information may be the identification information of the AP 300 or the identification information of the AP group. The validation AP information may be information designating a frequency band to be used by the AP 300. If validation AP information is the identification information of the AP 300, the WT 600 validates the corresponding AP 300. If the validation AP information is the identification information of an AP group, the WT 600 validates all the APs 300 belonging to the corresponding to AP group. If the validation AP information is information designating a frequency band, the WT 600 validates all the APs 300 using the corresponding frequency band. When the AP 300 uses a plurality of frequency bands, the WT 600 may control the AP 300 to use only a designated frequency band. When, for example, validation AP information is information designating 2.4 GHz, the WT 600 validates the AP 300 using the 2.4 GHz band. When validation AP information is information designating 5 GHz for AP group A, the WT 600 validates all the APs 300 that belong to AP group A and use the 5 GHz band. The AP 300 belonging to AP group A resumes operating in the 5 GHz band. Note that when validation AP information is information designating 5 GHz for the predetermined AP 300, the WT 600 validates only the AP 300 (for example, the AP 300-1A). The AP 300-1A resumes operating in the 5 GHz band.

An AP activation request message can contain the AP group information described above as AP group information managed by the eNB 200.

When sending a request for invalidation (deactivation) of the AP 300, the eNB 200 can also send AP group information together with the request to the WT 600. That is, the eNB 200 can send the AP group information to the WT 600 in an AP deactivation procedure. The AP deactivation procedure is a procedure for requesting the WT 600 to switch the valid AP 300 to an invalid (OFF) state.

For example, the eNB 200 sends an AP deactivation request (AP DEACTIVATION REQUEST) message containing AP group information to the WT 600. The AP deactivation request is a message for invalidating the valid AP 300. An AP deactivation request message may be a message for turning off the AP 300 whose switch is turned on (or a communication device (transmitter and/or receiver) which the AP 300 includes and whose switch is turned on).

An AP deactivation request message contains invalidation AP information concerning the AP 300 to be invalidated. Invalidation AP information is of the same type as that of validation AP information. In addition, an AP deactivation request message can contain the above AP group information as AP group information managed by the eNB 200.

(D) WT Configuration Update Procedure

As illustrated in FIG. 11, upon updating information, the WT 600 can send the updated information to the eNB 200. More specifically, the WT 600 can send a WT configuration update (WT CONFIGURATION UPDATE) message containing updated information to the eNB 200 in a WT configuration update procedure. A WT configuration update message is a message for transferring updated information.

For example, when the information (list) of the APs 300 is updated, the WT 600 sends the updated information to the eNB 200. The information of the APs 300 is updated when, for example, the new AP 300 is added, the AP 300 is deleted from a list, or the configuration of the AP 300 is changed. When, for example, the valid AP 300 is switched to an invalid state, the WT 600 changes the configuration of the AP 300. Likewise, when the invalid AP 300 is switched to a valid state, the WT 600 changes the configuration of the AP 300. In this case, the WT 600 can send information indicating the valid or invalid AP 300 (its communication device) as updated information to the eNB 200. Note that when the above switching operation is performed based on a message from the eNB 200, the WT 600 can omit the operation of the updated information to the eNB 200. In addition, when, for example, the frequency band used by the AP 300 changes or the position of the AP 300 changes, the WT 600 changes the configuration of the AP 300.

The eNB 200 can send AP group information to the WT 600 in accordance with the reception of updated information. That is, the eNB 200 can send AP group information to the WT 600 in a WT configuration update procedure. The WT configuration update procedure is a procedure for updating configuration data necessary for the eNB 200 and the WT 600 to accurately mutually use the data on the Xw interface.

For example, the eNB 200 sends a WT configuration update acknowledge (WT CONFIGURATION UPDATE ACKNOWLEDGE) message containing AP group information to the WT 600. A WT configuration update acknowledge message is a message for acknowledge (ACK) of updated information. For example, when a WT configuration update acknowledge message contains the information of the newly added AP 300, the eNB 200 can set an AP group to which the added AP 300 belongs. The eNB 200 can send a WT configuration update acknowledge message containing the identification information of an AP group to which the added AP 300 belongs.

A WT configuration update acknowledge message can contain the AP group information described above as AP group information managed by the eNB 200.

(E) Resource Status Request Procedure

As illustrated in FIG. 12, the eNB 200 can send AP group information together with a request for a report concerning the resource status of the AP 300 to the WT 600. That is, the eNB 200 can send AP group information to the WT 600 in a resource status request procedure. A resource status request procedure is a procedure for requesting for a report concerning load measurement on the AP 300 managed by the WT 600.

For example, the eNB 200 sends a resource status request (RESOURCE STATUS REQUEST) message containing AP group information to the WT 600. A resource status request message is a message for causing the WT 600 to initiate measurement requested accordance to parameters given in the message. A resource status request message may be an existing resource status request message extended to contain AP group information or a message newly specified to issue a request for a resource status to the WT 600.

A resource status request message can contain the AP group information described above as AP group information managed by the eNB 200. Note that a resource status request message may be a message for requesting a report concerning the resource statuses of APs for each AP group, as will be described later.

As described above, the eNB 200 can send the AP group information set in the eNB 200 to the WT 600. The WT 600 can receive the AP group information set in the eNB 200. This allows the WT 600 to know the AP group information. As a result, the WT 600 can manage the APs 300 for each group set in the eNB 200.

Note that the eNB 200 can notify the UE 100 of set AP group information. The UE 100 can perform traffic switching at the initiative of the UE, in the AP group to which the AP 300 to which the UE 100 itself connects (performs communication), with respect to another AP 300. On the other hand, when starting to connect (switch traffic) to a WLAN 30 or performing traffic switching with respect to the AP 300 belonging to another AP group, the UE 100 may not perform traffic switching unless any instruction is received from the eNB 200.

For example, as illustrated in FIG. 7, when starting traffic switching with respect to the AP 300-1A for the first time, a UE 100-1 may require a traffic switching instruction (Steering command) from the eNB 200. Upon receiving a traffic switching instruction from the eNB 200, the UE 100-1 starts traffic switching. Accordingly, the UE 100-1 does not autonomously perform traffic switching, based on auxiliary information, even if a determination condition for switching from cellular communication to WLAN communication is satisfied. For example, the UE 100-1 does not autonomously perform traffic switching from AP group A to AP group B.

Assume that a UE 100-2 has already performed traffic switching to the AP 300-1B. The UE 100-2 determines, based on AP group information from the eNB 200, that the AP 300-1B and an AP 300-2B belong to same AP group B. When a determination condition for the AP 300-2B is satisfied, the UE 100-2 can start traffic switching without receiving any traffic switching instruction from the eNB 200. That is, when performing traffic switching with respect to the APs 300 belonging to the same AP group, the UE 100-2 may not require any traffic switching instruction from the eNB 200.

Second Embodiment

The second embodiment will be described next with reference to FIGS. 12 to 14. FIG. 12 is a sequence chart for explaining an operation according to the second embodiment. FIG. 13 is a view for explaining an operation according to the second embodiment. FIG. 14 is a sequence chart for explaining an operation according to the second embodiment.

The first embodiment has exemplified the case in which the eNB 200 sends AP group information to the WT 600. The second embodiment will exemplify a case in which a WT 600 sends a report concerning the resource statuses of APs for each AP group to an eNB 200. A description of the same part as that of the first embodiment will be properly omitted.

As described in the first embodiment, assume that a UE 100 autonomously performs traffic switching with respect to APs 300 in the same AP group without any instruction from the eNB 200. In this case, because the UE 100 receives no instruction from the eNB 200, a high UE throughput may not be guaranteed in the newly connected AP 300. The following technique makes it possible to guarantee a high UE throughput for each group.

As illustrated in FIG. 12, the eNB 200 sends a resource status request message to the WT 600. In this case, the resource status request message is a message for requesting a report concerning the resource statuses of APs for each AP group.

For example, as shown in FIG. 13, a resource status request message may contain information (Group To Report/ Group To Report Item) concerning an AP group as a report target. Information concerning an AP group may contain the identification information (Group ID) of the group. In addition, a resource status request message may contain the identification information (AP ID) of the AP 300 belonging to an AP group as a report target. Furthermore, a resource status request message may contain at least one of the type of resource status to be contained in a report and a report period (Reporting Periodicity) with which a report is sent to the eNB 200.

Note that the type of resource status is, for example, information designating at least one of a basic service set (BSS) load, UE average data rate (UE Average data rate), BSS average access delay (BSS Average Access Delay), BSS AC access delay (BSS AC Access Delay), and WLAN metric (WLAN Metrics). A BSS load is a load on a current air traffic level. A UE average data rate is an average data rate (in an uplink and/or a downlink) concerning the UE 100 connected to the AP 300, which is calculated by the AP 300. A BSS average access delay is a scalar indication of a BSS load at a relative level in the AP 300, and an average access delay from the time when a packet (DCF or EDCAF MPDU) is prepared for transmission to a frame in which the packet is transmitted in the AP 300. A BSS AC access delay is a scalar indication of a BSS load at a relative level in an access controller (AC), and is an average access delay from the time when a packet (DCF or EDCAF MPDU) for transmission in the AC to a frame in which the packet is transmitted. WLAN metrics is information concerning a WAN (backhaul) speed and load in an uplink and/or a downlink concerning the AP 300.

The WT 600 sends a resource status response (RESOURCE STATUS RESPONSE) message to the eNB 200. The WT 600 can send the resource status response message containing a report concerning resource statuses for each AP group to the eNB 200. A resource status response message is a message indicating that measurement requested concerning all or some (subset) of measurement targets has been normally started. The WT 600 performs measurement concerning the resource status of the AP 300 and reports the measurement result to the eNB 200.

As illustrated in FIG. 14, a resource status response message may contain a report (Group Measurement Result/ AP Measurement Result) concerning resource statuses for each AP group. A report (Group Measurement Result) concerning resource statuses for each AP group may contain, as a value indicating resource statuses for each AP group, a statistical value calculated based on the resource statuses of the respective APs 300 constituting an AP group. A statistical value may be an average value of the resource statuses of the APs 300 or the minimum value of the resource statuses of the APs 300 in the same group. When calculating a statistical value, the WT 600 sets the resource statuses of the valid APs 300 as targets but need not set the resource statuses of the invalid APs 300 as targets. In addition, a report (AP Measurement Result) concerning resource statuses for each AP group may contain values indicating the resource statuses of the respective APs 300 constituting an AP group as values indicating the resource statues for each AP group. In this case, "AP Measurement Result" may contain values indicating the resource statuses of all the APs 300 constituting the AP group or only values indicating the resource statuses of the valid APs 300 of the plurality of APs 300 constituting the AP group. The WT 600 can contain resource statuses designated from the eNB 200 in a report depending on the types of resource statuses.

A resource status response message may contain, as the resource status of the AP 300, at least one of a basic service set load (BSS Load), UE average data rate (UE Average data rate), BSS average access delay (BSS Average Access Delay), BSS AC access delay (BSS AC Access Delay), and WLAN metrics (WLAN Metrics).

As illustrated in FIG. 12, the WT 600 sends a resource status update (RESOURCE STATUS UPDATE) message. In this case, the WT 600 can send a resource status update message containing a report concerning resource statuses for each AP group to the eNB 200. A resource status update message is a message for reporting a requested measurement result.

A resource status update message can contain information similar to that of the above resource status response message (see FIG. 14). In addition, the WT 600 can report a resource status update message with a period based on the report period contained in a resource status request message.

The eNB 200 receives a resource status response message and/or resource status update message based on a resource status request message. With this operation, the eNB 200 receives a report concerning the resource statuses of APs for each AP group from the WT 600. The eNB 200 determines, in consideration of the resource statuses of the APs for each AP group, whether to send a traffic switching instruction to the UE 100. Upon receiving values indicating the resource statuses of the respective APs 300 belonging to the AP group, the eNB 200 can calculate a statistical value (for example, an average value) for each AP group like the WT 600 described above. In consideration of the resource statuses of the APs for each AP group, the eNB 200 determines whether to send a traffic switching instruction to the UE 100.

If the resource statuses of the APs for each AP group satisfy the (requested) UE throughput (for example, the resource statuses of the APs for each AP group exceed a threshold), the eNB 200 sends a traffic switching instruction to the UE 100. Otherwise, the eNB 200 stops sending a traffic switching instruction to the UE 100.

As described above, the WT 600 sends a report concerning the resource statuses of APs for each AP group to the eNB 200, and the eNB 200 receives the report from the WT 600. The eNB 200 can determine whether to send a traffic switching to the UE 100, in consideration of not only the resource status of the AP 300 as a traffic switching target for the UE 100 but also the resource statuses of the APs for each AP group to which the AP 300 as a traffic switching target belongs. This can guarantee a high UE throughput even when the UE 100 has autonomously performed traffic switching in the same group.

(Modification)

A modification of the second embodiment will be described next. In the second embodiment described above, the eNB 200 performs determination based on the resource statuses of APs for each AP group. However, this is not exhaustive. The WT 600 may perform determination concerning a request from the eNB 200 based on the resource statuses of APs for each AP group.

Assume a case in which the eNB 200 sends, to the WT 600, a request for cellular WLAN aggregation as a transmission and reception technique for data from the UE 100 by using both cellular communication (LTE communication) and WLAN communication.

Note that cellular WLAN aggregation is a communication scheme for transmitting and receiving data (traffic) from the UE 100 by using both cellular communication and WLAN communication. More specifically, in cellular WLAN aggregation, traffic (user data) belonging to the same data bearer or different data bearers are transmitted and received by using both cellular communication and WLAN communication.

When cellular WLAN aggregation is to be executed, a first data bearer that performs data transmission/reception via the eNB 200 without via the AP 300 and a second data bearer that performs data transmission/reception via the AP 300 and the eNB 200 are established between the UE 100 and an SGW 400 (EPC 20). Note that when cellular WLAN aggregation is being executed, only the second data bearer may be established or both the first and second data bearers may be established.

The first data bearer is a data bearer for usual cellular communication. In contrast, the second data bearer is a data bearer for cellular WLAN aggregation. The second data bearer is split by the eNB 200 (for example, on the PDCP layer). One (second data bearer-1) of the split second data bearer is terminated at the UE 100 without via the AP 300, and the other (second data bearer-2) is terminated at the UE 100 via the AP 300. Note that second data bearer-2 may be terminated at the UE 100 via the WT 600 as well as at the AP 300.

When cellular WLAN aggregation is executed, the UE 100 transmits and receives data by using at least the second data bearer.

More specifically, when cellular WLAN aggregation is executed, the eNB 200 divides data belonging to the second data bearer into data (cellular-side data) to be transmitted by cellular communication and data (WLAN-side data) to be transmitted by WLAN communication in a downlink. The eNB 200 transmits the cellular-side data to the UE 100 by cellular communication using second data bearer-1. In contrast to this, the eNB 200 transmits the WLAN-side data to the AP 300 by using a direct communication path. The AP 300 transmits the WLAN-side data received from the eNB 200 to the UE 100 by WLAN communication using second data bearer-2.

On the other hand, in an uplink, the UE 100 divides data belonging to the second data bearer into data (cellular-side data) to be transmitted by cellular communication and data (WLAN-side data) to be transmitted by WLAN communication. The UE 100 transmits the cellular-side data to the eNB 200 by cellular communication using second data bearer-1. In contrast to this, the UE 100 transmits the WLAN-side data to the AP 300 by WLAN communication using second data bearer-2. The AP 300 transmits the WLAN-side data received from the UE 100 to the eNB 200 by using a direct communication path. The eNB 200 combines (reconstructs) the cellular-side data received from the UE 100 and the WLAN-side data received from the AP 300, and transmits the resultant data to the SGW 400.

Note that in cellular WLAN aggregation, all the data belonging to the second data bearer may be transmitted and received by cellular communication, or all the data belonging to the second data bearer may be transmitted and received by WLAN communication.

In this case, in order to execute cellular WLAN aggregation, the eNB 200 sends, to the WT 600, a request for cellular WLAN aggregation containing the identification information of the AP 300 as a cellular WLAN aggregation target. Upon receiving the request for cellular WLAN aggregation, the WT 600 determines, based on the resource statuses of APs for each AP group, whether to accept cellular WLAN aggregation. The WT 600 therefore determines whether to accept cellular WLAN aggregation, in consideration of not only the resource status of the AP 300 indicated by identification information but also resource statuses for each AP group to which the AP 300 belongs.

Even if the resource status of the AP 300 indicated by identification information satisfies a (requested) UE throughput, the WT 600 may reject a request for cellular WLAN aggregation if the resource statuses of APs in the same AP group do not satisfy the UE throughput. Accordingly, the WT 600 can send a response (positive acknowledge/negative acknowledge) to a request for cellular WLAN aggregation to the eNB 200 based on resource statuses for each AP group. A response may contain reason information indicating that the cause is the resource statuses for each AP group.

This makes it possible to guarantee a high UE throughput even when the UE 100 that executes cellular WLAN aggregation has autonomously performed traffic switching in the same group.

Third Embodiment

Figure 15:
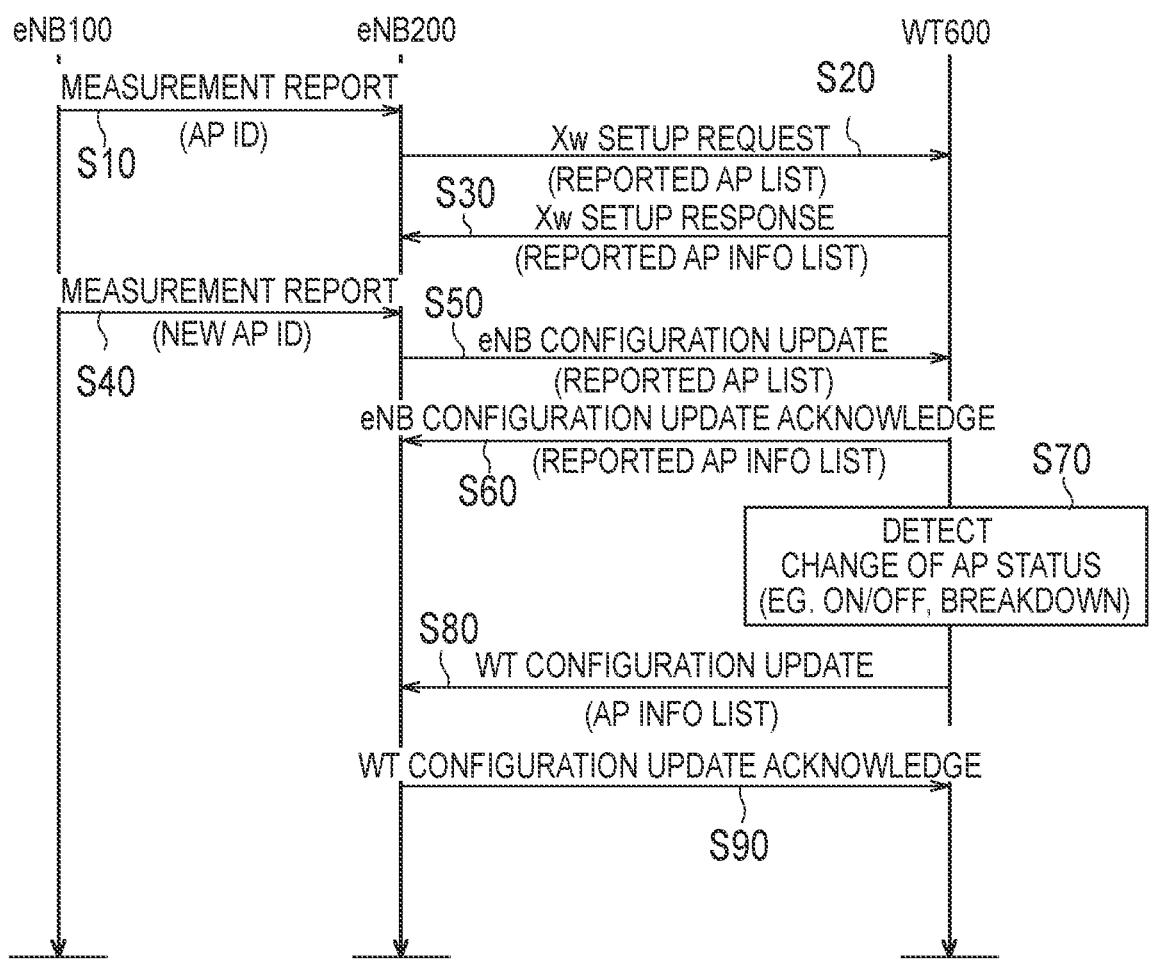
FIG. 15 is a sequence chart for explaining an operation according to the third embodiment.

The third embodiment will be described next with reference to FIGS. 15 and 16. FIG. 15 is a sequence chart for explaining an operation according to the third embodiment. FIGS. 16A and 16B are views for explaining an operation according to the third embodiment.

The first embodiment has exemplified the case in which the eNB 200 sends AP group information to the WT 600. The third embodiment will exemplify a case in which a WT 600 sends AP group information to an eNB 200. Note that a description of the same parts as those of the first and second embodiments (including the modification) will be properly omitted.

As illustrated in FIG. 15, in step S10, a UE 100 transmits a report (Measurement report) concerning an AP 300 to the eNB 200. The eNB 200 receives the report concerning the AP 300 from the UE 100. As described above, the report concerning the AP 300 can contain the identification information (AP ID) of the AP 300 detected by the UE 100.

In step S20, the eNB 200 can send information concerning the AP 300 reported from the UE 100 to the WT 600. More specifically, the eNB 200 can send an Xw setup request message containing the information concerning the AP 300 to the WT 600. For example, as shown in FIG. 16A, an Xw setup request message contains a list (Reported AP list) of the APs 300 reported from the UE 100. The list of the APs 300 contains the identification information of the APs 300. This list may be a list of the APs 300 reported from the UE 100 or a list of the APs 300 reported from a plurality of UEs 100. Obviously, an Xw setup request message may contain not only information concerning the AP 300 but also other information (for example, the identifier (Global eNB ID) of an eNB 200-1, information (Served Cells) of a cell managed by the eNB 200, and a list (GU Group Id List) of pools to which the eNB 200 belongs) (see FIG. 16A).

The WT 600 receives an Xw setup request message from the eNB 200. This makes the WT 600 receive information concerning the AP 300 from the eNB 200. The WT 600 specifies an AP group to which each AP 300 indicated by the information concerning the AP 300 belongs.

Note that an operator (for example, an operator who manages a WLAN (AP, WT) or the WT 600 may set an AP group in advance. For example, like the eNB 200 in the first embodiment, the WT 600 may set an AP group to which each AP 300 belongs.

In step S30, the WT 600 can send, to the eNB 200, AP group information (Reported AP Info list) concerning an AP group to which each AP 300 belongs. More specifically, the WT 600 can send an Xw setup response message containing AP group information to the eNB 200. The eNB 200 can receive the AP group information from the WT 600.

For example, as shown in FIG. 16B, an Xw setup response message contains a list (AP group ID List) of AP groups to which the respective APs 300 notified from the eNB 200 belong. The list (AP group ID List) of AP groups contains information concerning each AP group. A list of AP groups may contain the identification information (Group ID) of AP groups to which each AP 300 notified from the eNB 200 belongs. The identification information of an AP group may be associated with information (AP ID List) concerning each AP 300 belonging to the group. AP ID List contains the identification information of each AP 300. AP ID List may be information corresponding to only each AP 300 notified from the eNB 200. Alternatively, AP ID List may contain information concerning each AP 300 notified from the eNB 200 and information concerning (a plurality of) APs 300 other than each AP 300 notified from the eNB 200. That is, AP ID List may contain not only information concerning each AP 300 notified from the eNB 200 but also information concerning other APs 300 belonging to the group. In addition, a message notified from the WT 600 to the eNB 200 may contain information (the identification information of the APs 300) of all the APs 300 belonging to the AP group notified to the eNB 200.

Assume a case in which an AP 300-1A, an AP 300-2A, and an AP 300-3A belong to AP group A. Even when only the AP 300-1A is notified from the eNB 200, the WT 600 can notify the eNB 200 of all information concerning the AP 300-1A, the AP 300-2A, and the AP 300-3A as APs belonging to AP group A.

As described above, the WT 600 can send, as AP group information to the eNB 200, information concerning each AP 300 (that is, each AP 300 reported from the UE 100 to the eNB 200) notified to the eNB 200 and information concerning each AP 300 (that is, each AP 300 not reported from the UE 100 to the eNB 200) other than each AP 300 belonging to the same group as that to which each AP 300 belongs. For example, the WT 600 may send information concerning all the APs 300 belonging to each AP group to the eNB 200. The eNB 200 can receive, as AP group information from the WT 600, information concerning each AP 300 reported from the UE 100 and information concerning each AP 300 (that is, each AP 300 not reported from the UE 100 to the eNB 200) other than each AP 300 belonging to the same group as that to which each AP 300 belongs. The eNB 200 can receive information concerning all the APs 300 belonging to an AP group as AP group information from the WT 600. Note that an Xw setup response message may contain not only information concerning the AP 300 but also other information (for example, the identifier (Global WT ID) of the WT 600, criticality diagnosis (Criticality Diagnostics), and the like) (see FIG. 16B). Note that "critical diagnosis" may be interpreted (understood) as "error diagnosis".

The eNB 200 can set an AP group to which each AP 300 belongs, based on AP group information received from the WT 600. The eNB 200 can notify the UE 100 of set AP group information.

In step S40, the UE 100 transmits a report concerning the AP 300 to the eNB 200 as in step S10. Upon detecting the AP 300 not reported to the eNB 200 in step S10, the UE 100 may transmit the report to the eNB 200. Accordingly, the UE 100 may transmit the report to the eNB 200 to report the newly detected AP 300. The UE 100 may contain the identification information of the newly detected AP 300 in the report or may contain the identification information of the AP 300 logged on the UE 100 in the report. Upon transmitting the report to the eNB 200, the UE 100 may discard the information of the AP 300.

In step S50, the eNB 200 can send information concerning the AP 300, reported from the UE 100, to the WT 600. More specifically, the eNB 200 can send an eNB configuration update message containing information concerning the AP 300 to the WT 600. An eNB configuration update message can contain information similar to that in step S20.

Note that if the AP 300 reported from the UE 100 is the AP 300 contained in the AP group information received from the WT 600, the eNB 200 may skip the processing in step S50.

In step S60, the WT 600 can send, to the eNB 200, AP group information concerning an AP group to which each AP 300 notified from the eNB 200 belongs in step S50. More specifically, the WT 600 can send an eNB configuration update acknowledge message containing AP group information to the eNB 200. An eNB configuration update acknowledge message can contain information similar to that in step S30.

In step S70, the WT 600 detects a change in the state of the managed AP 300 (or the group to which the AP 300 belongs). In this case, the WT 600 performs processing in step S80. The WT 600 may perform the processing in step S80 upon updating information (for example, a list) concerning the managed AP 300 in accordance with a change in the state of the managed AP 300. For example, in the following cases, the WT 300 may detect a change in the state of the AP 300:

When the AP 300 becomes invalidated (deactivated);
When the AP 300 becomes validated (activated);
When the WT 600 has failed to perform communication with the AP 300 (due to, for example, a failure in the AP 300);
When the WT 600 has become able to perform communication with the AP 300 (owing to the restoration of the AP 300);
When the number of APs 300 to be managed has increased;
When the number of APs 300 to be managed has decreased; and
When the group to which the AP 300 belongs has changed.

In step S80, the WT 600 can send, to the eNB 200, AP group information (AP Info list) concerning the AP 300 whose state has changed. More specifically, the WT 600 can send a WT configuration update message containing AP group information to the eNB 200.

The WT 600 may specify the eNB 200 that manages information concerning the AP 300 whose state has changed and send AP group information to the specified eNB 200. The WT 600 may specify, as the eNB 200 as a transmission target, the eNB 200 that has transmitted, in the past, the identification information of the AP 300 whose state has changed. The WT 600 may specify, as the eNB 200 as a transmission target, the eNB 200 that has transmitted, in the past, information concerning a group to which the AP 300 whose state has changed belongs.

The WT 600 may transmit information concerning the state of the AP 300, in addition to the identifier of the AP 300 whose state has changed, as AP group information to the eNB 200. For example, information concerning the state of the AP 300 is information indicating at least one of "invalidate (deactivate)", "validate (activate)", "incommunicable", "communicable", "AP added to group", and "AP deleted from group".

As described above, in accordance with updating of information concerning the AP 300 reported from the UE 100 to the eNB 200 (a change in the state of the corresponding AP 300), the WT 600 can send AP group information (especially updated information concerning the AP 300) to the eNB 200. In addition, in accordance with updating of information concerning at least one or more APs 300 belonging to the group to which the AP 300 reported from the UE 100 to the eNB 200 belongs (a change in the state of the corresponding AP 300), the WT 600 may send AP group information (especially updated information concerning the AP 300 not reported from the UE 100 to the eNB 200) to the eNB 200.

The eNB 200 can receive, from the WT 600, AP group information (especially updated information concerning the AP 300) transmitted in accordance with updating of information concerning the AP 300 reported from the UE 100 to the eNB 200 (a change in the state of the corresponding AP 300). In addition, the eNB 200 may send, to the eNB 200, AP group information transmitted in accordance with updating of information concerning at least one or more APs 300 belonging to the group to which the AP 300 reported from the UE 100 to the eNB 200 belongs.

The eNB 200 can update the set AP 300 based on the AP group information. The eNB 200 can notify the UE 100 of the updated information concerning the AP 300.

In step S90, the eNB 200 can send a WT configuration update acknowledge message to the WT 600.

As described above, the eNB 200 sends information concerning the AP 300 reported from the UE 100 to the WT 600. The eNB 200 receives AP group information concerning the AP group to which the corresponding AP 300 belongs. This allows the eNB 200 to know only AP group information associated with the own station without receiving AP group information not associated with the own station. Accordingly, the eNB 200 and the WT 600 can properly share information associated with the WLAN.

(Modification)

A modification of the third embodiment will be described next with reference to FIG. 17. FIGS. 17A and 17B are sequence charts for explaining the modification of the third embodiment. In this modification, a node (to be referred to as a WLAN node 700 hereinafter) different from the WT 600 manages AP groups. Note that a description of the same parts as those of the first and second embodiments (including the modification) will be properly omitted.

Figure 17A:
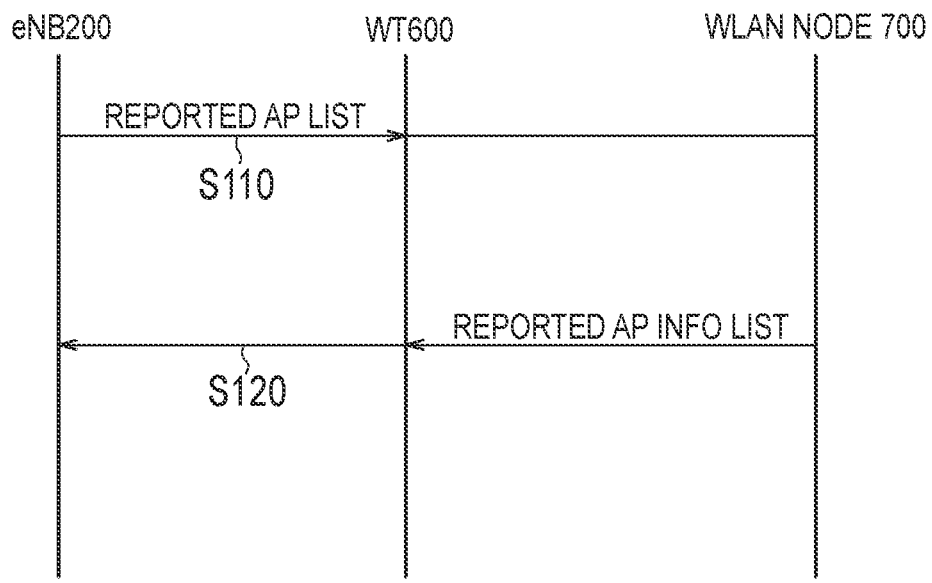
FIGS. 17A and 17B are sequence charts for explaining a modification of the third embodiment.

As illustrated in FIG. 17A, in step S110, the eNB 200 sends information (Reported AP list) concerning the AP 300 reported from the UE 100 to the WT 600. The eNB 200 can send, for example, information concerning the AP 300 to the WT 600 with an Xw setup request message, an eNB configuration update message, or the like. The WT 600 can receive the information from the eNB 200. This allows the eNB 200 to send the information concerning the AP 300 to the WLAN node 700 via the WT 600.

The WLAN node 700 is a node managed by an operator or a partner of the operator. The partner of the operator manages a WLAN. The WLAN node 700 may be a node provided in the WLAN. The WLAN node 700 may be an operation administration and maintenance (OAM) 500 for managing the WLAN unlike the OAM 500 provided in the EPC 20. The WLAN node manages AP groups. The operator or the partner of the operator may set in advance AP groups to be managed by the WLAN node, or the WLAN node 700 may set in advance AP groups belonging to each AP 300 like the eNB 200 in the first embodiment described above.

In step S120, the WLAN node 700 can send, to the WT 600, AP group information (Reported AP Info list) concerning AP groups to which the respective APs 300 notified from the eNB 200 belong. The WT 600 can send the AP group information received from the WLAN node 700 to the eNB 200. This allows the WLAN node 700 to send AP group information to the eNB 200 via the WT 600.

As described above, the eNB 200 can send information concerning the AP 300 reported from the UE 100 to the WLAN node 700 via the WT 600, and receive AP group information concerning the AP group to which the AP 300 belongs from the WLAN node 700.

Figure 17B:
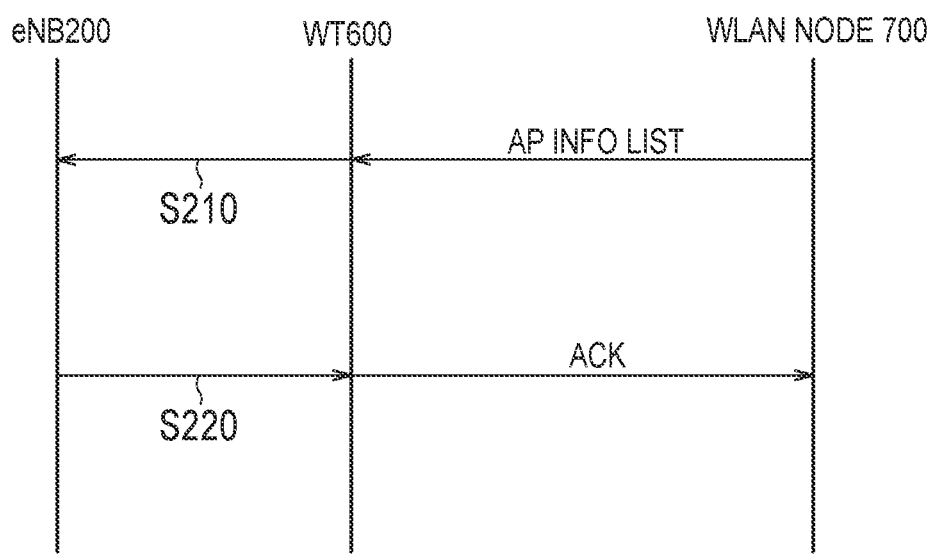

As illustrated in FIG. 17B, in step S210, upon detecting a change in the state of the managed AP 300 (or the group to which the AP 300 belongs) as in the third embodiment, the WLAN node 700 can send AP group information (AP Info list) to the eNB 200 via the WT 600.

In step S220, in response to the reception of AP group information, the eNB 200 can send positive acknowledge (ACK) to the WLAN node 700 via the WT 600.

Other Embodiments

Although the contents of the present application have been described with reference to each embodiment described above, it should not be understood that descriptions and drawings defining part of the disclosure limit the contents of the application. This disclosure makes various alternative embodiments, the embodiments, and the operation techniques obvious to those skilled in the art.

In each embodiment described above, the WT 600 may be, for example, an access controller (AC) that manages (controls) the APs 300. The WT 600 is a host node for ACs, and may be a network apparatus for managing ACs.

The operations according to the respective embodiments and the respective modifications described above may be executed in combination with each other as needed.

For example, in the first and second embodiments, as in the third embodiment, the WLAN node 700 may manage AP group information. The WT 600 can send information received from the eNB 200 to the WLAN node 700. In addition, the WT 600 can send information received from the WLAN node 700 to the eNB 200.

In the third embodiment described above, the eNB 200 directly receives a report concerning the AP 300 from the UE 100. However, this is not exhaustive. The eNB 200 may send a report concerning the AP 300, received via the neighbour eNB 200, to the WT 600. When the UE 100 detects the AP 300 and at the same time, detects a cell managed by the eNB 200, the neighbour eNB 200 may transfer a report from the UE 100 to the eNB 200. For example, when a report from the UE 100 contains not only the identification information of the AP 300 and the identification information of the cell (sell ID), the neighbour eNB 200 may transfer the report to the eNB 200 that manages the cell.

The third embodiment described above has exemplified the operations of the UE 100, the eNB 200, and the WT 600 as a series of sequences. However, it is possible to execute only some of the operations instead of executing all the operations. For example, the operations in steps S20 and S30 may be skipped, and the operations in steps S80 and S90 may be skipped.

Although not particularly mentioned in the above-described embodiment, a program for causing a computer to execute each process performed by any one of the above-described each node (the UE 100, the eNB 200, the AP 300, the MME 400, the WT 600 and the like) can be provided. Furthermore, the program may be recorded on a computer-readable medium. When the computer-readable medium is used, it is possible to install the program in a computer. Here, the computer-readable medium for recording the program may be a non-transitory recording medium. The non-transitory recording medium is not particularly limited. For example, the non-transitory recording medium may include a recording medium such as a CD-ROM or a DVD-ROM.

Alternatively, a chip may be provided which is configured by: a memory configured to store a program for performing each process performed by any one of the UE 100, eNB 200, and the AP 300; and a processor configured to execute the program stored in the memory.

In the described-above embodiment, although an LTE system is described as an example of a mobile communication system, the present application is not limited to the LTE system and may be applied to a system other than the LTE system.

[Addition Statement]

This addition statement focuses on how to exchange the potential parameters.

(1) Discussion

Following objective has been captured; Specify procedures and signalling for the exchange of parameters (e.g., parameters that were considered beneficial in TR 37.870 and that may be found beneficial for Aggregation and Interworking Enhancement).

It could make a selection of potential parameters for two use cases. Since the eNB has the X2AP interface and procedures to exchange some parameter among neighbour eNBs, it should take it into consideration for the initial discussion of new Xw procedures for exchanging the potential parameters.

The potential parameters could be categorized as two types in terms of exchanging period of up-to-date information (see the below Table 1), obviously WLAN AP identifier does not need to be exchanged frequently, which means this parameter would be exchanged by event trigger e.g., turn on/off the AP power. On the other parameters, since these parameters represent dynamic information (e.g. traffic level, backhaul delay), it is desirable the eNB get up-to-date them frequently for estimating UE throughput in WLAN.

Note that in order to identify which AP's information, the WLAN identifier may be exchanged with other parameters.

TABLE 1

| Static exchange | WLAN identifiers | | | | | |
|---|---|---|---|---|---|---|
| Dynamic exchange | BSS Load | UE Average data rate | BSS Average Access Delay/ BSS AC Access Delay | WAN Metrics | UE Through-put/Data rate | Node load information |

Table 1 is category of potential parameters.

Considering the above categorization, we focus on following X2 procedures:

(a) eNB Configuration Update procedure and Cell Activation Procedure eNB Configuration Update procedure is for providing up-to-date configuration (e.g. served cell information) to other node. For example, when the eNB turn off a cell, this procedure would be used to inform neighbor eNBs of configuration change. For the WLAN case, there is a possibility that deployed AP is turned off due to some reason (e.g. breakdown), so WT may need to provide such AP's configuration information to the eNB so that the eNB removes the AP's information from the SIB. In case of AP's breakdown, when the AP is recovered from breakdown, eNB may need to know such fact. The purpose to know the up-to-date configuration is same as eNB Configuration Update procedure, so this procedure could be reused as baseline of new Xw procedure for the WLAN case.

Cell Activation procedure is for a request of cell activation to other node. For example, when the traffic demand is increased and over/reach a threshold, the eNB could request to a neighbor eNB to switch on one or more cells (which are inactive due to e.g., energy saving reason) as a candidate cell of load balancing. For the WLAN case, it is natural for an eNB to request WT to switch on APs as other candidate for the same purpose, so the Cell Activation procedure could be reused as baseline of new Xw procedure for AP activation.

(b) Resource Status Reporting Procedure

This procedure is specified to request the reporting of load measurement (e.g. Hardware Load Indicator, Radio Resource Status) to other eNBs. An eNB sends the RESOURCE STATUS REQUEST message to certain eNB to request the measurement, then the eNB which received the message initiates the measurement and periodically reports (if the Reporting Periodicity IE is included) the measurement results as RESOURCE STATUS UPDATE message. Captured parameters are also related to the AP's load status. Additionally the eNB needs to get these parameters "periodically", so the current Resource Status Reporting procedure may meet such requirement and it could be reused for sharing the load information between 3GPP and WLAN as baseline of new Xw procedure.

It should take existing procedures of X2AP into consideration for the initial discussion of Xw procedures.

Note that regarding the UE Average data rate, since this parameter seems to require UE-associated signalling, whether Resource Status Reporting procedure is appropriate for the exchange of this parameter or not is FFS.

Proposal 1: For the exchange of WLAN identifier, eNB Configuration Update and Cell Activation procedure of X2AP should be reused as baseline procedure.

Proposal 2: For the exchange of load measurement of WLAN node, Resource Status Reporting procedure should be reused as baseline procedure.

(2) Conclusion

In this additional statement, we propose the candidate procedures of X2AP for new Xw procedure as baseline. RAN3 is kindly asked to discuss and agree on the following proposals.

The invention claimed is:

1. A communication method, comprising:
transmitting, by a base station included in an Evolved Universal Terrestrial Radio Access Network (E-UTRAN), a request message requesting a measurement report of measurements on wireless LAN access points performed by a wireless LAN termination node, to the wireless LAN termination node configured to manage the access points, the request message including identification information identifying the access points and information indicating measurement objects to be measured by the wireless LAN termination node for the access points, at least one of the access points configured to provide radio resources to a user equipment located in a cell of the base station; and receiving, by the base station, the measurement report requested by the base station, from the wireless LAN termination node, wherein the request message is transmitted via an interface formed between the base station and the wireless LAN termination node, and the wireless LAN termination node is not the user equipment.

2. A base station included in an Evolved Universal Terrestrial Radio Access Network (E-UTRAN), the base station comprising:

a processor and a memory communicatively coupled to the processor; the processor configured to:

transmit a request message requesting a measurement report of measurements on wireless LAN access points performed by a wireless LAN termination node, to the wireless LAN termination node configured to manage the access points, the request message including identification information identifying the access points and information indicating measurement objects to be measured by the wireless LAN termination node for the access points, at least one of the access points configured to provide radio resources to a user equipment located in a cell of the base station; and receive the measurement report requested by the base station, from the wireless LAN termination node, wherein the request message is transmitted via an interface formed between the base station and the wireless LAN termination node, and the wireless LAN termination node is not the user equipment.

3. A wireless LAN termination node configured to manage wireless LAN access points, the wireless LAN termination node comprising:

a processor and a memory communicatively coupled to the processor; the processor configured to:

receive a request message requesting a measurement report of measurements on wireless LAN access points performed by the wireless LAN termination node, from a base station included in an Evolved Universal Terrestrial Radio Access Network (E-UTRAN), the request message including identification information identifying the access points and information indicating measurement objects to be measured by the wireless LAN termination node for the access points, at least one of the access points configured to provide radio resources to a user equipment located in a cell of the base station, and transmit the measurement report requested by the base station, to the base station, wherein the request message is sent via an interface formed between the base station and the wireless LAN termination node, and the wireless LAN termination node is not the user equipment.

4. The base station according to claim 1, wherein the measurement objects include Basic Service Set (BSS) load and backhaul load, and the measurement report includes identification information identifying the access points and information indicating the BSS load and the backhaul load of each of the access points.

5. The base station according to claim 1, wherein the access points consist of an access point group among which a user equipment autonomously performs traffic switching without notifying the base station.

* * * * *